(12) United States Patent
Perry et al.

(10) Patent No.: US 12,469,368 B2
(45) Date of Patent: *Nov. 11, 2025

(54) SELF-CENTERING USER INTERFACE FOR INPUTTING INFORMATION

(71) Applicant: Block, Inc., Oakland, CA (US)

(72) Inventors: Marc David Perry, Fairfax, CA (US); Kenneth Randall Kinsella Wigginton, Walnut Creek, CA (US)

(73) Assignee: Block, Inc., Oakland, CA (US)

( * ) Notice: Subject to any disclaimer, the term of this patent is extended or adjusted under 35 U.S.C. 154(b) by 314 days.

This patent is subject to a terminal disclaimer.

(21) Appl. No.: 18/146,950

(22) Filed: Dec. 27, 2022

(65) Prior Publication Data

US 2023/0125971 A1    Apr. 27, 2023

Related U.S. Application Data

(63) Continuation of application No. 16/276,283, filed on Feb. 14, 2019, now Pat. No. 11,587,412.

(51) Int. Cl.
*G07G 1/00* (2006.01)
*G06F 3/0482* (2013.01)
(Continued)

(52) U.S. Cl.
CPC ......... *G07G 1/0009* (2013.01); *G06F 3/0488* (2013.01); *G06Q 20/20* (2013.01);
(Continued)

(58) Field of Classification Search
CPC ... G07G 1/0009; G06F 3/0488; G06F 3/0482; G06Q 20/20; G06Q 20/4012;
(Continued)

(56) References Cited

U.S. PATENT DOCUMENTS 11,587,412 B1    2/2023  Perry et al.
2011/0174874 A1*  7/2011  Poznansky ........... G06Q 20/347
                                                                   235/379

(Continued)

OTHER PUBLICATIONS

Mrim Alnfiai et al. "BrailleEnter: A Touch Screen Braille Text Entry Method for the Blind." Procedia Computer Science 109C (2017) 257-264. (Year: 2017).

(Continued)

*Primary Examiner* — Eduardo Castilho
*Assistant Examiner* — Karlyannie M. Garcia
(74) *Attorney, Agent, or Firm* — Lee & Hayes, P.C.

(57) ABSTRACT

Techniques described herein are directed to, among other things, utilizing a self-centering user interface to receive information associated with a transaction. For instance, a computing device may receive a first input at a first location of a display. The computing device may then determine a positioning for the user interface, where the user interface may be substantially centered about the first location. In some instances, the computing device may display the user interface using the positioning. The computing device may then receive a second input corresponding to swipe from the first location of the display to a second location of the display. The computing device may then determine a symbol included in the user interface based at least in part on the second input. In some instances, the user interface includes a keypad for entering a personal identification number associated with a payment instrument.

20 Claims, 10 Drawing Sheets

(51) Int. Cl.
*G06F 3/0488* (2022.01)
*G06Q 20/20* (2012.01)
*G06Q 20/40* (2012.01)
*G07F 7/08* (2006.01)
*G07F 7/10* (2006.01)
*G09B 21/04* (2006.01)
*G09B 21/02* (2006.01)

(52) U.S. Cl.
CPC ......... *G06Q 20/4012* (2013.01); *G07F 7/088* (2013.01); *G07F 7/1033* (2013.01); *G09B 21/04* (2013.01); *A47G 2200/042* (2013.01); *G06Q 2220/00* (2013.01); *G09B 21/025* (2013.01)

(58) Field of Classification Search
CPC ... G06Q 2220/00; G07F 7/088; G07F 7/1033; G07F 7/0873; G07F 7/10; G09B 21/04; G09B 21/025; G09B 21/006; G09B 21/008; A47G 2200/042
See application file for complete search history.

(56) References Cited

U.S. PATENT DOCUMENTS

| | | |
|---|---|---|
| 2014/0181722 A1 | 6/2014 | Kim et al. |
| 2014/0297434 A1* | 10/2014 | Singhal ............ G06K 19/07773 705/21 |
| 2014/0331130 A1 | 11/2014 | Belisle et al. |
| 2016/0260086 A1 | 9/2016 | Cho et al. |
| 2017/0103395 A1 | 4/2017 | Everhart |
| 2018/0095588 A1 | 4/2018 | Klein et al. |
| 2019/0050859 A1 | 2/2019 | Hajimusa et al. |
| 2019/0265828 A1 | 8/2019 | Hauenstein et al. |
| 2019/0294246 A1 | 9/2019 | Lin et al. |

OTHER PUBLICATIONS

"Use AssistiveTouch on your iPhone, iPad, or iPod touch"—Apple Support. Dec. 15, 2018.
Wolf et al. "Performance of Eyes-Free Mobile Authentication" Workshop on Usable Security (USEC) 2018. Available at https://www.ndss-symposium.org/wp-content/uploads/2018/07/usec2018_02-4_Wolf_paper.pdf (Year: 2018).

* cited by examiner

SELF-CENTERING USER INTERFACE FOR INPUTTING INFORMATION

PRIORITY

This application is a continuation of, and claims priority to, U.S. patent application Ser. No. 16/276,283, filed on Feb. 14, 2019, and is fully incorporated by reference herein.

BACKGROUND

In today's commerce, customers use payment instruments, such as debit cards and credit cards, to conduct transactions with merchants. For instance, during a transaction, a point-of-sale (POS) device of a merchant may receive payment information (e.g., a card number, an expiration date, etc.) associated with a payment instrument. The customer may then use the POS device to input a personal identification number (PIN) associated with the payment instrument. In some instances, the POS device may include a touchscreen display that the customer uses to input the PIN. However, this may be problematic if the customer is visually impaired, such as if the customer is blind or nearly blind.

BRIEF DESCRIPTION OF THE DRAWINGS

The above and other features of the present disclosure, its nature and various advantages, will be more apparent upon consideration of the following detailed description, taken in conjunction with the accompanying drawings in which.

Figure 1:
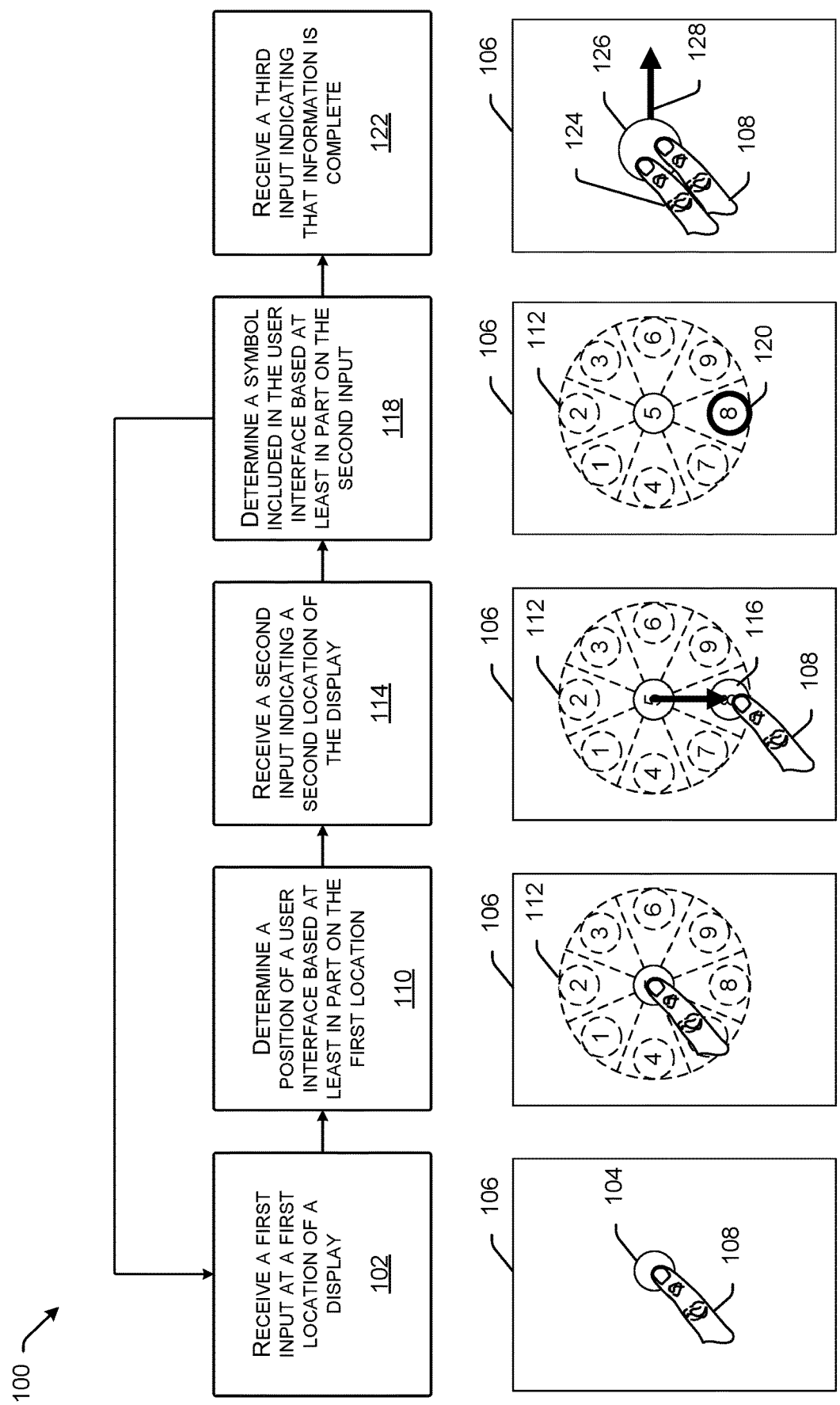
FIG. 1 illustrates an example process of using a self-centering user interface for inputting information into a computing device.

In the figures, the left-most digit(s) of a reference number identifies the figure in which the reference number first appears. The use of the same reference numbers in different figures indicates similar or identical items or features. Moreover, multiple instances of the same part are designated by a common prefix separated from the instance number by a dash. The drawings are not to scale.

DETAILED DESCRIPTION

As described above, customers use payment instruments (e.g., debit cards, credit cards, gift cards, etc.) to conduct transactions with merchants. For instance, during a transaction, merchant device(s) of a merchant may receive payment information (e.g., card number, expiration date, etc.) associated with a payment instrument. The customer may then use the merchant device(s) to input a personal identification number (PIN) associated with the payment instrument. A payment-processing service that facilitates transactions between merchants and customers may then receive information about the transaction from the merchant device(s), such as identifier(s) of item(s) being purchased by the customer, cost(s) of the item(s), a total cost of the transaction, the payment information, and/or the PIN. Using the information, the payment-processing service may authorize the payment instrument for the cost of the transaction.

In some instances, the merchant device(s) may include a touchscreen display that the customer uses to input the PIN. For instance, and using the touchscreen display, the merchant device(s) may display a keypad that the customer uses to input the PIN by selecting one or more numbers that are included in the PIN. To select a number, the customer may provide input using an input implement, such as a finger, a pen, and/or the like. However, this may be problematic if the customer is visually impaired, such as if the customer is blind or nearly blind. For instance, the customer may have trouble identifying location(s) of the one or more numbers included within the keypad.

As such, the application describes, among other things, a self-centering user interface (which may be referred to as a "user interface") that customers may utilize to input information associated with transactions, such as PINS. In some instances, the user interface may include a keypad that is configured in a given shape, such as a circle, a square, a pentagon, a hexagon, an octagon, and/or the like. For instance, the user interface may include a keypad with the numbers one through nine, where the number five is located in the center of the keypad and the numbers one through four and six through nine are located around the number five in the given shape. Additionally, or alternatively, in some instances, the user interface may include other types of symbols, such as letters, characters, punctuation marks, representations of items, and/or the like. For instance, if the merchant provides food items for customers, the symbols may include graphical elements that represent food items that are provided by the merchant.

In some instances, the user interface is self-centering. For instance, the merchant device(s) may receive, from the customer, a first input at a first location of the touchscreen display. The merchant device(s) may then determine a positioning for the user interface such that the user interface is substantially centered around the first location. For instance, if the user interface includes the keypad, the merchant device(s) may center the keypad such that the number five is located at the first location. In some instances, the merchant device(s) may then use the positioning to display the user interface using the touchscreen display. For instance, the user interface may be displayed such that the user interface is substantially centered around the first location.

The merchant device(s) may then determine a symbol selected by the customer based on a second input received via the touchscreen display. For a first example, the second input may correspond to a "swipe" from the first location of the touchscreen display to a second location of the touchscreen display. The merchant device(s) may then determine the symbol based on the direction of the swipe and/or the second location. For instance, the merchant device(s) may determine that the second location of the touchscreen display corresponds to a particular symbol included in the user interface. As such, the merchant device(s) may determine that the customer selected the particular symbol. Additionally, or alternatively, the merchant device(s) may determine that the direction of the swipe is towards a particular symbol. As such, the merchant device(s) may determine that the customer selected the particular symbol.

For a second example, and since the user interface is centered about the first location on the touchscreen display, where a symbol of the user interface is substantially located at the first location, the second input may include a "release" of the first input. For instance, if the first input corresponding to the customer's finger being placed on the first location of the touchscreen display, the second input may include the customer's finger being removed from the touchscreen display. In such an example, the merchant device(s) may determine that the particular symbol includes the symbol that was substantially located at the first location.

For a third example, the first input may include a multi-press input where two or more input implements (e.g., two or more of the customer's fingers) are placed at the first location of the touchscreen display. The second input may then include the two or more input implements being removed from the touchscreen display. In such an example, the merchant device(s) may determine that the particular symbol includes a symbol that is not included within the user interface. For instance, if the user interface includes a keypad with the numbers one through nine, then the particular symbol may include the number zero.

In some examples, the user interface may allow the customer to input additional types of inputs. For instance, the merchant device(s) may receive a first input corresponding to the customer placing two input implements at a first location of the touchscreen display. The merchant device(s) may then receive a second input corresponding to the customer swiping the input implements from the first location of the touchscreen display to a second location of the touchscreen display. The merchant device(s) may then determine an action based on a direction of the swipe. For instance, if the direction of the swipe includes a first direction, such as towards a left side of the touchscreen display, the merchant device(s) may clear information previously input by the customer. However, if the direction of the swipe includes a second direction, such as towards a right side of the touchscreen display, the merchant device(s) may determine that the information is complete.

For an example of using the user interface during a transaction, a merchant may utilize the merchant device(s) to input information associated with a transaction with a customer. For instance, the merchant may input identifier(s) of item(s) being purchased by the customer, cost(s) of the item(s), a total cost of the transaction, and/or the like. The merchant and/or the customer may then use the merchant device(s) to input payment information associated with a payment instrument. In some instances, the merchant device(s) may include a reader (e.g., a near-field-communication reader, a chip reader, etc.) that receives the payment information from the payment instrument and/or a customer device. In some instances, the merchant device(s) may then display, using the touchscreen display, a first keypad for inputting the PIN associated with the payment instrument. The first keypad may be substantially centered within the touchscreen display.

The merchant device(s) may then determine to operate in an accessibility mode, where the merchant device(s) use a second keypad (e.g., an example of the self-centering user interface described above) for receiving the PIN while operating in the accessibility mode. In some instances, the merchant device(s) determine to operate in the accessibility mode based on receiving input from the merchant and/or the customer. In some instances, the merchant device(s) determine to operate in the accessibility mode based on data (e.g., the payment information) received from the payment instrument and/or the customer device. For instance, the data may indicate that the merchant device(s) should operate in the accessibility mode during the transaction. In some instances, based on the determination, the merchant device(s) may cease from displaying the first keypad.

The merchant device(s) may then receive a first input at a first location of the touchscreen display. Based on the first input, the merchant device(s) may determine a positioning for the second keypad. For instance, the merchant device(s) may determine that the second keypad is substantially centered at the first location of the touchscreen display (e.g., the number five is substantially located at the first location of the touchscreen display). In some instances, when determining the positioning, the merchant device(s) determine an anchor point for the second keypad. The anchor point may indicate that the first location of the touchscreen display corresponds to the center of the second keypad (e.g., the anchor point may indicate that the first location of the touchscreen display corresponds to the number five). In some instances, the merchant device(s) then display the second keypad on the touchscreen display. For instance, the merchant device(s) may display the second keypad such that the second keypad is substantially centered at the first location of the touchscreen display.

The merchant device(s) may then receive a second input via the touchscreen display. In some instances, the second input may correspond to a "swipe" from the first location of the touchscreen display to a second location of the touchscreen display. In some instances, the second input may correspond to an input at the second location of the touchscreen display (e.g., the customer removes the input implements from the first location of the touchscreen display and then places the input implement at the second location of the touchscreen display). Still, in some instances, the second input may correspond to a removal of the input implement from the touchscreen display. For instance, if the first input included the customer's finger being placed at the first location, then the second input may include the customer's finger being removed from the touchscreen display. In such instance, the second location may correspond to a same location on the touchscreen display as the first location of the touchscreen display.

The merchant device(s) may then determine a number included in the second keypad based on the second input and/or the positioning (e.g., the anchor point) of the second keypad. For a first example, if the second location corresponds to a particular number of the second keypad, then the merchant device(s) may determine that the customer selected the particular number. For a second example, if the second input includes a "swipe" across the touchscreen display at a given direction, then the merchant device(s) may determine that a particular number is located at the given direction in the second keypad. The merchant device(s) may then determine that the customer selected the particular number. Still, for a third example, if the second input includes a removal of the first input, then the merchant device(s) may determine that the customer selected the particular number at the center of the second keypad (e.g., the number five).

In some examples, the merchant device(s) may perform similar processes using the second keypad in order to receive one or more additional numbers for the PIN. The merchant device(s) may then determine that the customer is finished inputting the PIN. In some instances, the merchant device(s) make the determination based on the customer entering each number for the PIN. For instance, if the PIN includes four numbers, the merchant device(s) may determine that the customer is finished inputting the PIN after the customer enters the fourth number. In some instances, the merchant device(s) make the determination based on the customer indicating that the PIN is complete. For instance, the merchant device(s) may receive a first input at the touchscreen display, where the first input corresponds to the customer placing two or more input implements at a first location of the touchscreen display. The merchant device(s) may then receive a second input at the touchscreen display, where the second input corresponds to a swipe of the input implements from the first location of the touchscreen display to a second location of the touchscreen display. Based on the second input, the merchant device(s) may determine that the customer is finished inputting the PIN.

In either instance, the merchant device(s) may send information associated with the transaction to the payment-processing service. The information may include, but is not limited to, a cost of the transaction, the payment information, and the PIN. Using the information, the payment-processing service may authorize the payment instrument for the cost of the transaction. Additionally, the payment-processing service may send, to the merchant device(s), data indicating whether the payment instrument was authorized for the cost of the transaction.

In some instances, the merchant device(s) may use at least one speaker (e.g., loudspeaker(s), headphone(s), etc.) to output audio representing instructions for using the user interface. For instance, while operating in the accessibility mode, the merchant device(s) may output, using the at least one speaker, first audio representing a first instruction to place a single input implement on the touchscreen display if the customer wants to select a first set of symbols (e.g., the numbers one to nine), two or more input implements on the touchscreen display if the customer wants to select a second set of symbols (e.g., the number zero), and two or more input implements on the touchscreen display if the customer wants to perform other actions (e.g., cancel information, indicate the information is complete, etc.). If the customer places a single input implement on the touchscreen display, the merchant device(s) may then output, using the at least one speaker, additional audio representing a second instruction on how to select a symbol.

For example, the second instruction may indicate that the customer is swipe the input implement in an upper-left direction to select a first symbol (e.g., the number one), swipe the input implement in an upper direction to select a second symbol (e.g., the number two), swipe the input implement in an upper-right direction to select a third symbol (e.g., the number three), swipe the input implement in a left direction to select a fourth symbol (e.g., the number four), raise the input implement off of the touchscreen display to select a fifth symbol (e.g., the number five), swipe the input implement in a right direction to select a sixth symbol (e.g., the number six), swipe the input implement in a downward-left direction to select a seventh symbol (e.g., the number seven), swipe the input implement in a downward direction to select an eighth symbol (e.g., the number eight), and/or swipe the input implement in a downward-right direction to select a ninth symbol (e.g., the number nine).

Additionally, if the customer places two or more input implements on the touchscreen display, the merchant device(s) may also output, using the at least one speaker, additional audio data representing a second instruction. For example, the second instruction may indicate that the customer is to raise the input implements off of the touchscreen display to select a symbol (e.g., the number zero), swipe the input implements in a left direction to perform a first action (e.g., delete information input into the merchant device(s)), swipe the input implements in the right direction to perform a second action (e.g., indicate that the information is complete), and/or so forth. Although these are just a few of examples of instructions that may be provided by the merchant device(s), in other examples, the merchant device(s) may provide different and/or additional instructions.

In some examples, the merchant device(s) may include a merchant-facing computing device and a customer-facing computing device. The merchant-facing computing device may be used (e.g., by a merchant or an employee or other agent working for the merchant) to perform merchant functionalities. "Merchant functionality," as described herein, can be associated with functionalities that are availed via a merchant application that can be executable by the merchant-facing computing device (and/or in some examples, via the customer-facing computing device). For instance, merchant functionality can enable a device to facilitate transactions between a merchant and a customer. In at least one example, the merchant functionality can enable a device to obtain payment information (e.g., from a customer-facing computing device) to settle a transaction and/or send payment information to the payment-processing service for payment processing. In at least one example, the merchant functionality can be associated with a dashboard to enable an operator of a device to manage transactions, payments, and so forth, via the dashboard. In at least one example, such merchant functionalities can be presented via merchant user interfaces that enable merchants, for example, to interact with merchant-facing computing devices to perform the merchant functionalities.

The customer-facing computing device can be used (e.g., by a customer) to perform customer functionalities. "Customer functionality," as described herein, can be associated with functionalities that are availed via a customer application executable by the customer-facing computing device (and/or in some examples, the merchant-facing computing device). For instance, customer functionality can enable a device to obtain payment information, and related information, and send the payment information, and related information, to the merchant-facing computing device. Additionally, the customer functionality can enable a device to present information to a customer via a user interface(s). For instance, the customer functionality can enable a device to present, among other things, contents of a ticket (e.g., a cart, etc.), such as one or more items associated with a ticket, an amount of the ticket, a user interface for inputting PINS, and additional information (e.g., taxes, discounts (e.g., item-level or ticket-level), coupons, etc.) via a user interface(s).

Although the above examples describe using merchant device(s) to input information associated with a transaction, in other examples, the customer may use a customer device to input at least a portion of the information. For instance, the customer may input identifier(s) of item(s) being purchased by the customer, cost(s) of the item(s), and a total cost of the transaction into the customer device. Additionally, the customer may input the payment information associated with the payment instrument and the PIN associated with the payment instrument. When inputting the information, the customer device may operate similarly to the merchant device(s) described herein. For instance, the customer device may utilize the accessible mode for inputting the PIN. Additionally, after inputting the information, the customer device may send the information to the merchant device(s) and/or the payment-processing service for authorizing the payment instrument.

Additionally, although the above examples describe techniques for inputting symbol(s) using the user interface, in other examples, user interface(s) may allow symbol(s) to be input using other types of techniques. For a first example, and while the merchant device(s) are operating in the accessibility mode, a user interface may allow the customer to input symbol(s) by "drawing" the symbol(s) on the touchscreen display. For instance, if the customer is inputting the PIN using the user interface, the customer may draw each number included in the PIN on the touchscreen display. For a second example, and while the merchant device(s) are operating in the accessibility mode, a user interface may allow the customer to input symbol(s) by "tapping" on the touchscreen display. For instance, and again if the customer is inputting the PIN, the customer may tap once on the touchscreen display for the number one, tap twice on the touchscreen display for the number two, tap three times on the touchscreen display for the number three, and/or so forth.

As described herein, in some examples, a user interface may be substantially centered around a specific location of a touchscreen display when a symbol located within a center of the user interface is located closer to the specific location than other symbols included in the user interface. For instance, and if the user interface includes a keypad, the keypad may be substantially centered around a specific location of the touchscreen display when the number located in the center of the keypad (e.g., the number five) is located closer to the specific location than other numbers included in the user interface. Additionally, or alternatively, in some examples, a user interface may be substantially centered around a specific location of a touchscreen display when a point located at a center of the user interface is located closer the specific location than the points located at the edge of the user interface. In some instances, the point located at the center of the user interface may include an "anchor point" of the user interface. In some instances, the point of the user interface that is located at the specific location may include the "anchor point" of the user interface.

FIG. 1 illustrates an example process 100 of using a self-centering user interface for inputting information into a computing device (e.g., merchant device(s), a customer device, etc.). At operation 102, the computing device may receive a first input at a first location 104 of a display 106. For instance, the display may include a touchscreen display that is able receive input(s) from a customer. As shown, the first input may include the customer's finger 108 being placed at the first location 104 of the display 106. However, in other instances, the first input may include a different input implement (e.g., a pen, a pointer, etc.) being placed at the first location 104 of the display 106.

At operation 110, the computing device may determine a position of a user interface 112 based at least in part on the first location 104. For instance, the computing device may determine the position of the user interface 112 such that the user interface 112 is substantially centered at the first location 104. In the example of FIG. 1, the user interface 112 includes a circular keypad with the numbers one through nine, where the circular keypad is substantially centered at the first location 104. For instance, the number five, which included in the middle of the circular keypad, is substantially located on the first location 104. However, in other examples, the keypad may include any other shape, such as a square, a pentagon, a hexagon, an octagon, and/or the like. Additionally, in other examples, the user interface 112 may include symbols other than numbers.

In some instances, the computing device may display the user interface 112 at the position on the display 106. When displaying the user interface 112, the computing device may display one or more of the dashed lines illustrated in the example of FIG. 1 and/or the computing device may not display one or more of the dashed lines illustrated in the example of FIG. 1. In other instances, the computing device may not display the user interface 112. Rather, the computing device may determine that an anchor point for the user interface 112 includes the first location 104.

At operation 114, the computing device may receive a second input indicating a second location 116 of the display 106. In some instances, the second input may include the customer swiping the finger 108 from the first location 104 of the display 106 to the second location 116 of the display 106, which may be represented by the arrow. In other instances, the second input may include the customer removing the finger 108 from the display 106 and then placing the finger 108 back on the display 106 at the second location 116.

At operation 118, the computing device may determine a symbol 120 included in the user interface 112 based at least in part on the second input. In some instance, the computing device may determine the symbol 120 based on determining that the second location 116 of the display 106 corresponds to the symbol 120. For instance, and as illustrated in the example of FIG. 1, the second location 116 is substantially located over a portion of the user interface 112 that includes the symbol 120. In some instances, the computing device may determine the symbol 120 based on the direction of the swipe. For instance, since the symbol 120 is located in a downward direction from the first location 104, the computing device may determine the symbol 120 based on the swipe being in the downward direction.

In some instances, the computing device may repeat operations 102, 110, 114, and 118 in order to determine one or more additional symbols. For instance, if the customer is inputting a PIN into the computing device, the computing device may repeat operations 102, 110, 114, and 118 in order to determine additional symbols included in the PIN. However, when the customer is finished inputting the information into the computing device, then the example process may move to operation 122.

At operation 122, the computing device may receive a third input indicating that information is complete. For instance, the customer may determine that all of the information has been input into the computing device. As such, the computing device may receive the third input. In the example of FIG. 1, the third input may include the customer placing both the finger 108 and an additional finger 124 at a location 126 of the display 106. The customer may then swipe the finger 108 and the additional finger 124 in a direction on the display, which is represented by arrow 128. However, in other examples, the third input may include the customer swiping the finger 108 and the additional finger 124 in a different direction on the display 106.

In some instances, based on determining that the information is complete, the computing device may send the information to merchant device(s) and/or the payment-processing service. For instance, if the information includes a PIN associated with a payment instrument, the computing device may send the PIN to the merchant device(s) and/or the payment-processing service.

Figure 2:
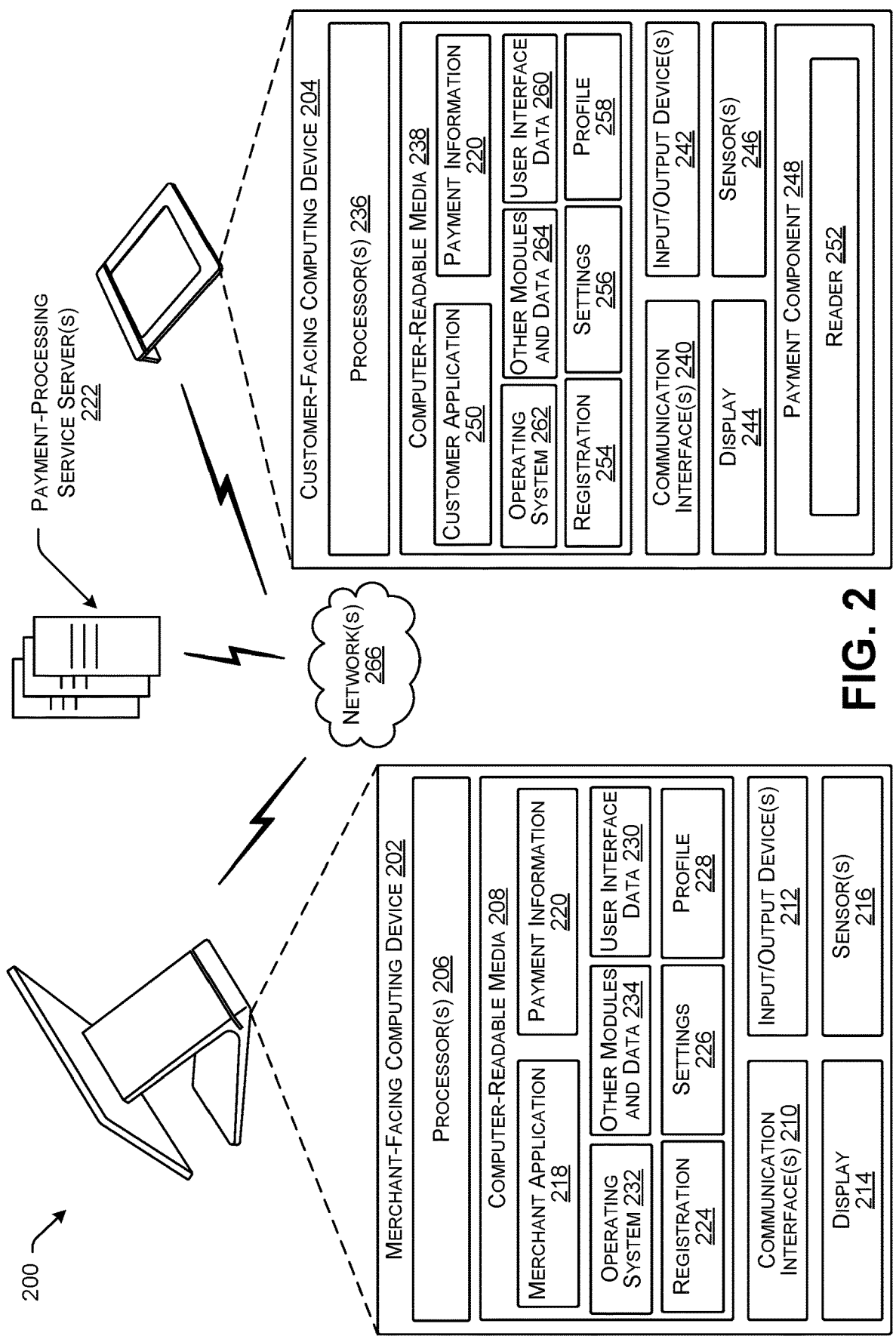
FIG. 2 illustrates an example environment in which the self-centering user interface may be used during a transaction.

FIG. 2 illustrates an example environment 200 in which the self-centering user interface may be used during a transaction. In at least one example, the example environment can include at least one merchant-facing computing device 202 and at least one customer-facing computing device 204.

The merchant-facing computing device 202 can be any suitable type of computing device, e.g., portable, semi-portable, semi-stationary, or stationary. Some examples of the merchant-facing computing device 202 can include tablet computing devices; smart phones and mobile communication devices; laptops, netbooks and other portable computers or semi-portable computers; desktop computing devices, terminal computing devices and other semi-stationary or stationary computing devices; dedicated register devices; wearable computing devices, or other body-mounted computing devices; augmented reality devices; or other computing devices capable of sending communications and performing the functions according to the techniques described herein.

As show, the merchant-facing computing device 202 may include processor(s) 206, computer-readable media 208, communication interface(s) 210, input/output device(s) 212, a display 214, and sensor(s) 216. Each processor 206 can itself comprise one or more processors or processing cores. For example, the processor 206 can be implemented as one or more microprocessors, microcomputers, microcontrollers, digital signal processors, central processing units, state machines, logic circuitries, and/or any devices that manipulate signals based on operational instructions. In some cases, the processor 206 can be one or more hardware processors and/or logic circuits of any suitable type specifically programmed or configured to execute the algorithms and processes described herein. The processor 206 can be configured to fetch and execute computer-readable processor executable instructions stored in the computer-readable media 208.

Depending on the configuration of the merchant-facing computing device 202, the computer-readable media 208 can be an example of tangible non-transitory computer storage media and can include volatile and nonvolatile memory and/or removable and non removable media implemented in any type of technology for storage of information such as computer-readable processor executable instructions, data structures, program modules or other data. The computer-readable media 208 can include, but is not limited to, RAM, ROM, EEPROM, flash memory, solid state storage, magnetic disk storage, optical storage, and/or other computer-readable media technology. Further, in some cases, the merchant-facing computing device 208 can access external storage, such as RAID storage systems, storage arrays, network attached storage, storage area networks, cloud storage, or any other medium that can be used to store information and that can be accessed by the processor 206 directly or through another computing device or network. Accordingly, the computer-readable media 208 can be computer storage media able to store instructions, modules or components that can be executed by the processor 206. Further, when mentioned, non-transitory computer-readable media exclude media such as energy, carrier signals, electromagnetic waves, and signals per se.

The computer-readable media 208 can be used to store and maintain any number of functional components that are executable by the processor 206. In some examples, these functional components comprise instructions or programs that are executable by the processor 206 and that, when executed, implement operational logic for performing the actions and services attributed above to the merchant-facing computing device 202. Functional components of the merchant-facing computing device 202 stored in the computer-readable media 208 can include a merchant application 218. The merchant application 218 may configure the merchant-facing computing device 202 as a POS terminal capable of performing merchant functionality, in some examples via one or more interactions with the customer-facing computing device 204. For instance, the merchant application 218 can enable a merchant to participate in transactions with one or more customers. That is, the merchant application 218 can configure the merchant-facing computing device 202 to handle the customer-facing computing device 204. In some examples, the merchant application 218 can determine whether the customer-facing computing device 204 is coupled to and/or connected to the merchant-facing computing device 202, and can provide an indication of such via a user interface. In at least one example, the merchant application 218 can indicate that a customer-facing computing device 204 is not coupled to and/or connected to the merchant-facing computing device 202.

In at least one example, the merchant application 218 can configure the merchant-facing computing device 202 to participate in transactions via one or more interactions with the customer-facing computing device 204 (or a customer application, or other provisioned customer functionality, executable by the merchant-facing computing device 202 and/or another device). For instance, in some examples, the customer-facing computing device 204 can obtain payment information 220 via contact (e.g., swipe, dip, etc.) and/or contactless (e.g., tap) interactions, as described herein, and can transmit the payment information 220 to the merchant application 218 for further processing. In some examples, the customer-facing computing device 204 can obtain payment information 220 via any other form of a payment instrument (e.g., unique identifier, biometric identifier, etc.). The merchant application 218 can configure the merchant-facing computing device 202 to interact with the customer-facing computing device 204 to obtain the payment information 220. For instance, the merchant application 218 can cause a selectable graphical element to be presented that triggers a payment request (e.g., generation of instructions for the presentation of a user interface presenting such a request) to be output via a customer-facing computing device 204 coupled to the merchant-facing computing device 202. Furthermore, the merchant application 218 can configure the merchant-facing computing device 202 to transmit received payment information 220 to server(s) associated with the payment-processing service (e.g., payment-processing service server(s) 222) to process the transactions. In at least one example, the merchant application 218 can track a status of a payment flow between the merchant-facing computing device 202 and a customer-facing computing device 204 coupled to the merchant-facing computing device 202, and can output an indication of the status via a user interface (e.g., via a status bar).

Additionally, the merchant application 218 can enable a merchant to record cash, gift cards, and other forms of tender. Furthermore, in at least one example, the merchant application 218 can enable the merchant-facing computing device 202 to perform card-not-present (CNP) transactions. For instance, in such an example, the merchant application 218 can cause a user interface to be presented that enables a merchant, employee, or other agent working on behalf of the merchant to input payment information 220 via the user interface. A merchant can utilize a CNP transaction if the payment reader 252 is not working or a payment instrument is not being read, for example. Additionally or alternatively, a merchant can utilize a CNP transaction if it is taking an order over the phone, for example.

In at least one example, the merchant application 218 can be associated with a user interface that enables merchants to, among other things, perform one or more of the functionalities described above with respect to the merchant device(s). In at least one example, the user interface can be presented via a webview or web browser that is configured to enable a merchant to access services supported by the payment-processing service. In other examples, the user interface can be presented via an application (e.g., the merchant application 218), which can be a mobile application or a desktop application, which is provided by the payment processing-service service or is an otherwise dedicated application. In some examples, the user interface can support third-party content, which can be linked or otherwise accessible to the merchant. In at least one example, the user interface can be a GUI which can present graphical elements via the user interface to convey information to merchants and/or customers and/or otherwise enable the merchant to perform merchant operations.

In addition, the computer-readable media 208 can also store data, data structures and the like, that are used by the functional components. For example, data stored by the computer-readable media 208 can include device identifier information 224, which can indicate which customer-facing computing device(s) and/or merchant-facing computing device(s) are coupled to the merchant-facing computing device 202. The data stored by the computer-readable media 208 can further include settings information 226 and profile information 228. The settings information 226 can store settings information associated with the settings of the merchant-facing computing device 202. For instance, the settings information 226 can store information such as languages available on the merchant-facing computing device 202, a language selection for the merchant-facing computing device 202 (e.g., input language, keyboard language, spoken language, etc.), symbolistics (e.g., high contrast) associated with the merchant-facing computing device 202, volume control, brightness control, network priorities (e.g., back-up networks), date, time, time zone, passwords, account information, etc. The profile information 228 can store one or more profiles associated with the merchant and/or customer(s) of the merchant, as described above.

In addition, the computer-readable media 208 can store user interface data 230 representing self-centering user interface(s) that can be used to input payment information 220 associated with a transaction. Furthermore, the computer-readable media 208 can store additional functional components such as an operating system 232 for controlling and managing various functions of the customer-facing computing device 204 and for enabling basic user interactions with the customer-facing computing device 204. Moreover, in at least one example, the computer-readable media 238 can store other modules and data 234.

The customer-facing computing device 204 can be any suitable type of computing device, e.g., portable, semi portable, semi-stationary, or stationary. Some examples of the customer-facing computing device 204 can include tablet computing devices; smart phones and mobile communication devices; laptops, netbooks and other portable computers or semi-portable computers; desktop computing devices, terminal computing devices and other semi-stationary or stationary computing devices; dedicated register devices; wearable computing devices, or other body-mounted computing devices; augmented reality devices; or other computing devices capable of sending communications and performing the functions according to the techniques described herein.

In the illustrated example, the customer-facing computing device 204 includes at least processor(s) 236, computer-readable media 238, communication interface(s) 240, input/output (I/O) device(s) 242, a display 244, sensor(s) 246, and a payment component 248. Each processor 236 can itself comprise one or more processors or processing cores. For example, the processor 236 can be implemented as one or more microprocessors, microcomputers, microcontrollers, digital signal processors, central processing units, state machines, logic circuitries, and/or any devices that manipulate signals based on operational instructions. In some cases, the processor 236 can be one or more hardware processors and/or logic circuits of any suitable type specifically programmed or configured to execute the algorithms and processes described herein. The processor 236 can be configured to fetch and execute computer-readable processor executable instructions stored in the computer-readable media 238.

Depending on the configuration of the customer-facing computing device 204, the computer-readable media 238 can be an example of tangible non-transitory computer storage media and can include volatile and nonvolatile memory and/or removable and non removable media implemented in any type of technology for storage of information such as computer-readable processor executable instructions, data structures, program modules or other data. The computer-readable media 238 can include, but is not limited to, RAM, ROM, EEPROM, flash memory, solid state storage, magnetic disk storage, optical storage, and/or other computer-readable media technology. Further, in some cases, the customer-facing computing device 204 can access external storage, such as RAID storage systems, storage arrays, network attached storage, storage area networks, cloud storage, or any other medium that can be used to store information and that can be accessed by the processor 236 directly or through another computing device or network. Accordingly, the computer-readable media 238 can be computer storage media able to store instructions, modules or components that can be executed by the processor 236. Further, when mentioned, non-transitory computer-readable media exclude media such as energy, carrier signals, electromagnetic waves, and signals per se.

The computer-readable media 238 can be used to store and maintain any number of functional components that are executable by the processor 236. In some examples, these functional components comprise instructions or programs that are executable by the processor 236 and that, when executed, implement operational logic for performing the actions and services attributed above to the customer-facing computing device 204. Functional components of the customer-facing computing device 204 stored in the computer-readable media 238 can include a customer application 250.

The customer application 250 may configure the customer-facing computing device 204 as a POS terminal capable of performing customer functionality. For instance, the customer application 250 can configure the customer-facing computing device 204 to obtain payment information 220, and related information, and send the payment information 220, and related information, to the merchant application 218 on the merchant-facing computing device 202. In at least one example, the customer application 250 can configure the customer-facing computing device 204 to request and/or receive authentication information (e.g., signature, PIN, biometric, etc.) to authenticate the payment information 220. In at least one example, the customer application 250 can receive payment information 220 from the payment component 248 and transmit the payment information 220 to the merchant-facing computing device 202.

In at least one example, the payment component 248 can be housed in, or otherwise associated with, a secure enclave. The payment component 248 can perform functionalities to control payment interfaces (e.g., a contactless interface, a contact interface, etc.), a wireless communication interface, a wired interface, a user interface (e.g., a signal condition device (field-programmable gate array (FPGA))), etc. In at least one example, the payment component 248 can include a reader 252, which can read payment information 220 associated with a payment instrument. In some examples, the reader 252 can be a Europay, MASTERCARD®, VISA® (EMV) payment reader, a read head for reading a magnetic strip of a payment card, etc. The payment information 220 can include a name of the customer, an address of the customer, a type (e.g., credit, debit, etc.) of a payment instrument, a number associated with the payment instrument, a verification value (e.g., PIN, Verification Key Indicator (PVKI), PIN Verification Value (PVV), Card Verification Value (CVV), Card Verification Code (CVC), etc.) associated with the payment instrument, an expiration data associated with the payment instrument, a primary account number (PAN) corresponding to the customer (which may or may not match the number associated with the payment instrument), restrictions on what types of charges/debts can be made, etc. In at least one example, the payment component 248 can include encryption technology for encrypting the payment information upon receiving the payment information.

In some examples, the customer application 250 can configure the customer-facing computing device 204 to present calls to action via the user interface. For instance, when a merchant indicates that transaction is complete, the customer application 250 can present, via the user interface, an instruction to a customer to swipe, insert, or tap a payment instrument to pay for the transaction. Or, the customer application 250 can present, via the user interface, a request for authentication information (e.g., PIN, biometric input, signature, etc.) from a customer, gratuity, feedback, loyalty information, etc. Additionally or alternatively, the customer application 250 can configure the customer-facing computing device 204 to present information associated with processing of a transaction via the user interface. For instance, the customer application 250 can configure the customer-facing computing device 204 to present a message that a customer's payment instrument is approved, is being authorized, is declined, etc. In some examples, the customer application 250 can configure the customer-facing computing device 204 to present a message associated with a split tender or a refund.

In some examples, the customer application 250 can configure the customer-facing computing device 204 to detect errors and present messages associated with such errors. For instance, customer errors can include a payment instrument not being charged, an amount charged violating transaction limitations/restrictions, payment not being able to be processed in a particular country, an improper payment method (e.g., swipe when the payment instrument is a EMV card), exceeding a PIN try limit, etc. Other errors can include merchant errors, terminal errors (e.g., connectivity, power failure, tamper error, etc.), payment instrument errors (e.g., information missing, card not supported, etc.), etc.

In some examples, the customer application 250 can configure customer-facing computing device 204 to operate in the accessibility mode in which the customer-facing computing device 204 receives information using the self-centering user interface, which is described herein. For instance, the customer application 250 can configure the customer-facing computing device 204 to operate in the accessibility mode in order to receive a PIN associated with a payment instrument.

In addition, the computer-readable media 238 can also store data, data structures and the like, that are used by the functional components. For example, data stored by the computer-readable media 238 can include device identifier information 254 which can indicate which customer-facing computing device(s) and/or merchant-facing computing device(s) are coupled to the customer-facing computing device 204. The data stored by the computer-readable media 238 can further include settings information 256 and profile information 258. The settings information 256 can store settings information associated with the settings of the customer-facing computing device 204. For instance, the settings information 256 may store languages available on the customer-facing computing device 204, a language selection for the customer-facing computing device 204 (e.g., input language, keyboard language, spoken language, etc.), symbolistics (e.g., high contrast) associated with the customer-facing computing device 204, volume control, brightness control, network priorities (e.g., back-up networks), date, time, time zone, passwords, account information, etc. In some examples, the settings of the customer-facing computing device 204 can be the same as the settings of the merchant-facing computing device 202. In other examples, the settings of the customer-facing computing device 204 can be different than the settings of the merchant-facing computing device 202. The profile information 258 can store one or more profiles associated with the merchant and/or customer(s) of the merchant, as described above.

In addition, the computer-readable media can store user interface data 260 representing self-centering user interface(s) for inputting the payment information 220 associated with a transaction. Furthermore, the computer-readable media 238 can store additional functional components such as an operating system 262 for controlling and managing various functions of the customer-facing computing device 204 and for enabling basic user interactions with the customer-facing computing device 204. Moreover, in at least one example, the computer-readable media 238 can store other modules and data 264.

The display 214 and/or the display 244 can employ any suitable display technology. For example, the display 214 and/or the display 244 can be a liquid crystal display, a plasma display, a light emitting diode display, an OLED (organic light-emitting diode) display, an electronic paper display, or any other suitable type of display able to present digital content thereon. In some examples, the display 214 and/or the display 244 can have a touch sensor associated with the display 214 and/or the display 244 to provide a touchscreen display configured to receive touch inputs for enabling interaction with a user interface presented on the display 214 and/or the display 244. Accordingly, examples herein are not limited to any particular display technology. Further, in some examples, the merchant-facing computing device 202 and/or the customer-facing computing device 204 may not have a display.

The communication interface(s) 210 and/or the communication interface(s) 240 can include one or more interfaces and hardware components for enabling communication between the merchant-facing computing device 202 and the customer-facing computing device 204 and/or various other devices, such as over one or more networks 266 or directly. In at least one example, the network(s) 266 can include long-range communication networks and/or short-range communication networks. For instance, the network(s) 266 can include the Internet, cable networks, cellular networks, wireless networks (e.g., Wi-Fi) and wired networks, Bluetooth® networks, Bluetooth® low energy (BLE) networks, Near-field Communication (NFC) (e.g., NFC signals), etc. Accordingly, in at least one example, the communication interface(s) 210 and/or the communication interface(s) 240 can enable communication through one or more of the Internet, cable networks, cellular networks, wireless networks (e.g., Wi-Fi) and wired networks, Bluetooth®, BLE, NFC, etc. Additionally or alternatively, the communication interface(s) 210 and/or the communication interface(s) 240 can include one or more Universal Serial Bus (USB) interfaces, Ethernet interfaces, etc.

The I/O device(s) 212 and/or the I/O device(s) 242 can include speakers, a microphone, a camera, a projector, a cash drawer, a printer, a barcode scanner, a scale, a kitchen display system (KDS), various user controls (e.g., buttons, a joystick, a keyboard, a keypad, etc.), a haptic output device, and so forth. In at least one example, the I/O device(s) 212 and/or the I/O device(s) 242 can be peripheral devices. In other examples, the I/O device(s) 212 and/or the I/O device(s) 242 can respectively be integrated into the merchant-facing computing device 202 and/or the customer-facing computing device 204.

In some instances, the merchant-facing computing device 202 may include power source(s) and/or the customer-facing computing device 204 may include power source(s). The power source(s) can include one or more power supplies such as a physical connection to AC power or a battery. The power source(s) can include power conversion circuitry for converting AC power and generating a plurality of DC voltages. When the power source(s) include a battery, the battery can be charged via a physical power connection, via inductive charging, or via any other suitable method. Although not depicted as physically connected to the other components of the merchant-facing computing device 202 and/or the customer-facing computing device 204 in FIG. 2, the power source(s) can supply a variety of voltages to the components of the merchant-facing computing device 202 and/or the customer-facing computing device 204 in accordance with the requirements of those components.

Figure 3:
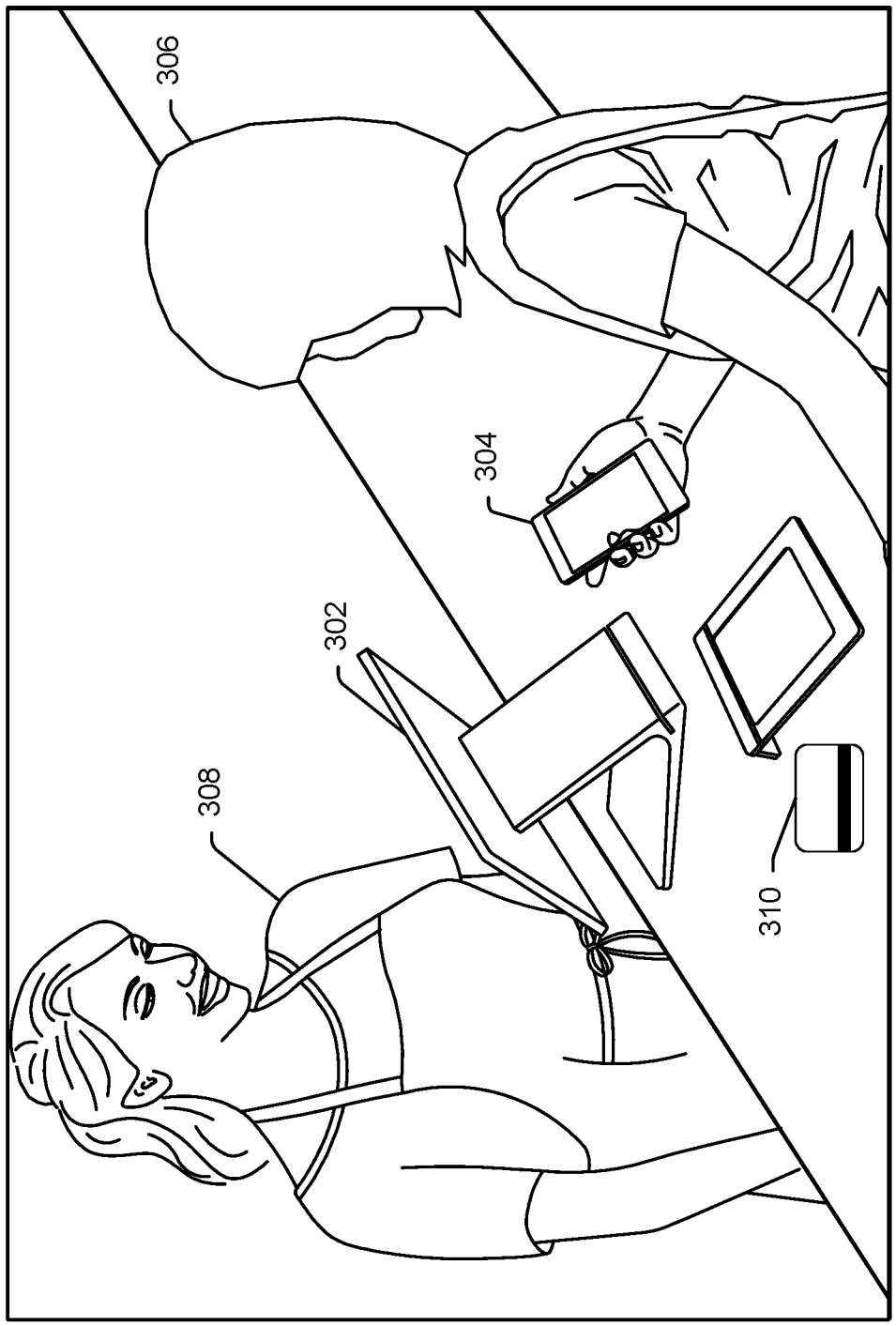
FIG. 3 illustrates an example of merchant device(s) being coupled to a customer's device during a transaction.

FIG. 3 illustrates an example where a merchant-facing computing device 302, which can correspond to the merchant-facing computing device 202 as described above with reference to FIG. 2, is coupled to at least a customer device 304. As described herein, in some examples, functionality can be temporarily provisioned to the customer device 304 of a customer 306. For instance, in at least one example, a customer application can be provisioned to the customer device 304 and, as a result, the customer device 304 can be configured to perform at least some customer functionalities.

In such examples, the customer device 304 of the customer 306 can act as a customer-facing computing device (e.g., the customer-facing computing device 204). That is, the customer device 304 can communicate with the merchant-facing computing device 302 to process independent transactions, as described above in FIG. 2, or can interact with the merchant-facing computing device 302 to process independent steps of a same transaction, as also described above in FIG. 2. FIG. 3 illustrates the customer device 304 interacting with the merchant-facing computing device 302 to process independent steps of a same transaction between the customer 306 and a merchant 308, but is not limited to such an example. For instance, in the example of FIG. 3, the customer 306 can utilize the customer device 304 that has been temporarily provisioned with the customer application to input information associated with the transaction, such as by using the self-centering user interface described herein. For example, the customer 306 can utilize the customer device 304 to input the PIN associated with a payment instrument 310 used by the customer 306 to satisfy a cost of the transaction.

Figure 4:
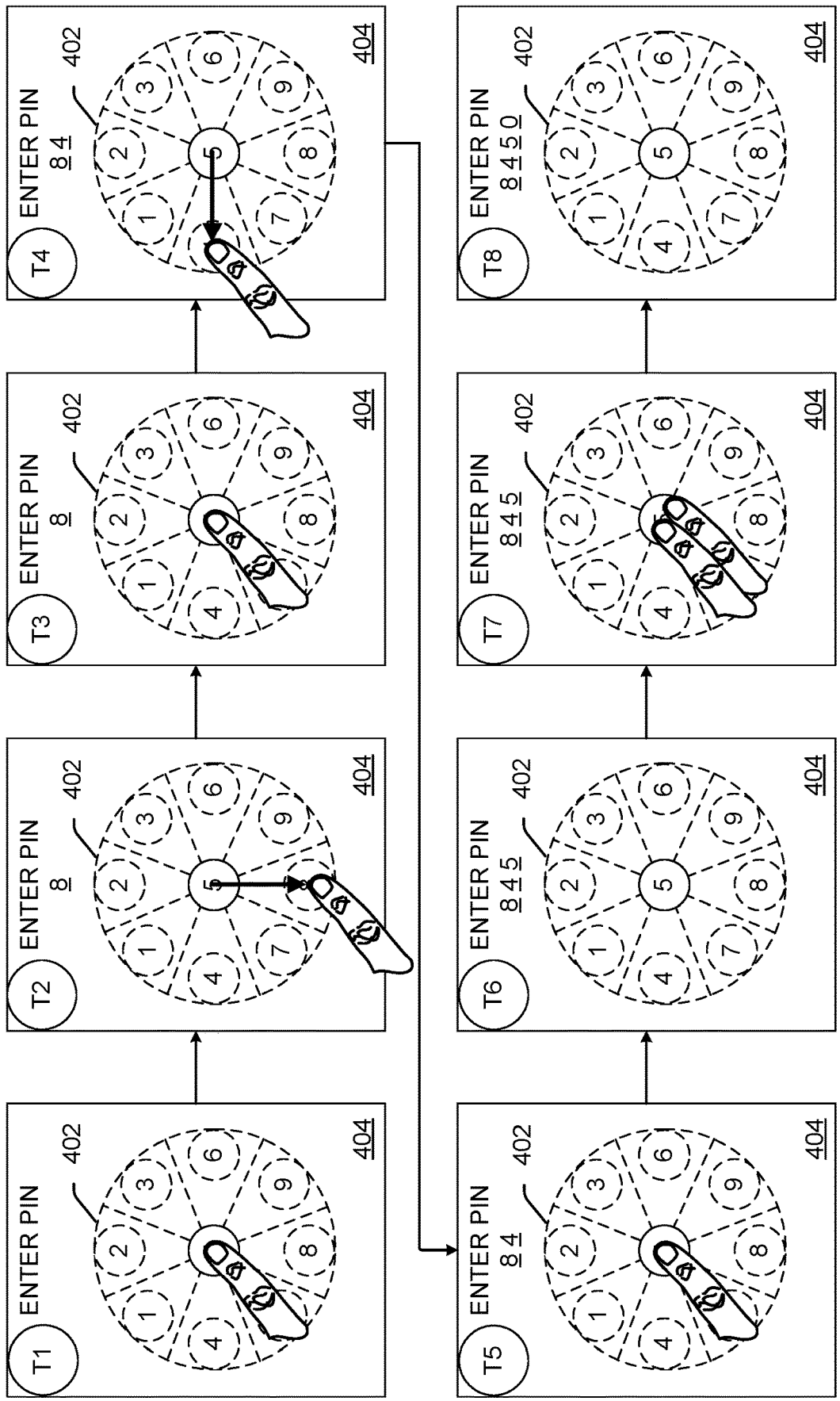
FIG. 4 illustrates an example of using a self-centering user interface to input a personal identification number associated with a payment instrument.

FIG. 4 illustrates an example of using a self-centering user interface 402 to input a personal identification number associated with a payment instrument. For instance, at time T1, a computing device (e.g., the merchant device(s), the merchant-facing computing device 202, 302, the customer-facing computing device 204, the customer device 304, etc.) may receive a first input at a first location of a display 404. Based on the first location, the computing device may determine a first positioning for the user interface 402. For example, the computing device may determine that the user interface 402 is to be substantially centered at the first location (e.g., the number five is located at the first location). In some instances, the computing device may use the first positioning to display the user interface 402 on the display 404. For instance, the computing device may display, on the display 404, the user interface 402 as being substantially centered at the first location.

At time T2, the computing device may receive a second input at a second location of the display 404. For instance, and as illustrated in the example of FIG. 4, the second input includes the customer swiping the finger from the first location of the display 404 to the second location of the display 404, as indicated by the arrow. Based on the second input, the computing device may determine a first number to include in the PIN. For a first example, the computing device may determine that the second location corresponds to the first number. To determine that the second location corresponds to the first number, the computing device may determine that the second location is located over a portion of the user interface 402 that includes the first number. For a second example, the computing device may determine that the second input includes a swipe in a downward direction on the display 404. The computing device may then determine that the first number is located at the downward direction from the center of the user interface 402. Based on the determinations, the computing device may determine the first number. As shown in the example of FIG. 4, the first number includes the number eight.

At time T3, the computing device may receive a third input at a third location of the display 404. Based on the third location, the computing device may determine a second positioning for the user interface 402. For example, the computing device may determine that the user interface 402 is to be substantially centered at the third location (e.g., the number five is located at the third location). In some instances, the computing device may use the second positioning to display the user interface 402 on the display 404. For instance, the computing device may display, on the display 404, the user interface 402 as being substantially centered at the third location.

At time T4, the computing device may receive a fourth input at a fourth location of the display 404. For instance, and as illustrated in the example of FIG. 4, the fourth input includes the customer swiping the finger from the third location of the display 404 to the fourth location of the display 404, as indicated by the arrow. Based on the fourth input, the computing device may determine a second number to include in the PIN. For a first example, the computing device may determine that the fourth location corresponds to the second number. To determine that the fourth location corresponds to the second number, the computing device may determine that the fourth location is located over a portion of the user interface 402 that includes the second number. For a second example, the computing device may determine that the fourth input includes a swipe in a left direction on the display 404. The computing device may then determine that the second number is located at the left direction from the center of the user interface 402. Based on the determinations, the computing device may determine the second number. As shown in the example of FIG. 4, the second number includes the number four.

At time T5, the computing device may receive a fifth input at a fifth location of the display 404. Based on the fifth location, the computing device may determine a third positioning for the user interface 402. For example, the computing device may determine that the user interface 402 is to be substantially centered at the fifth location (e.g., the number five is located at the fifth location). In some instances, the computing device may use the third positioning to display the user interface 402 on the display 404. For instance, the computing device may display, on the display 404, the user interface 402 as being substantially centered at the fifth location.

At time T6, the computing device may receive a sixth input associated with the display 404. For instance, and as illustrated in the example of FIG. 4, the sixth input includes the customer removing the finger from the display 404. Based on the sixth input, the computing device may determine a third number to include in the PIN. For example, the computing device may determine that the sixth input corresponds to the center of the user interface 402. The computing device may then determine that the third number is located at the center of the user interface 402. Based on the determinations, the computing device may determine the third number. As shown in the example of FIG. 4, the third number includes the number five.

At time T7, the computing device may receive a seventh input at a seventh location of the display 404. As shown, the seventh input corresponds to the customer placing two fingers on the display 404 at the seventh location. Based on the seventh location, the computing device may determine a fourth positioning for the user interface 402. For example, the computing device may determine that the user interface 402 is to be substantially centered at the seventh location (e.g., the number five is located at the seventh location). In some instances, the computing device may use the fourth positioning to display the user interface 402 on the display 404. For instance, the computing device may display, on the display 404, the user interface 402 as being substantially centered at the seventh location.

At time T8, the computing device may receive an eighth input associated with the display 404. For instance, and as illustrated in the example of FIG. 4, the eighth input includes the customer removing the fingers from the display 404. Based on the eighth input, the computing device may determine a fourth number to include in the PIN. For example, the computing device may determine that the eighth input corresponds to the customer removing the two fingers from the center of the user interface 402. Based on the determination, the computing device may determine the fourth number. As shown in the example of FIG. 4, the fourth number includes the number zero.

In some instances, the computing devices may then receive an input indicating that the PIN is complete. The computing device may then send information representing the PIN to one or more computing devices.

Figure 5A:
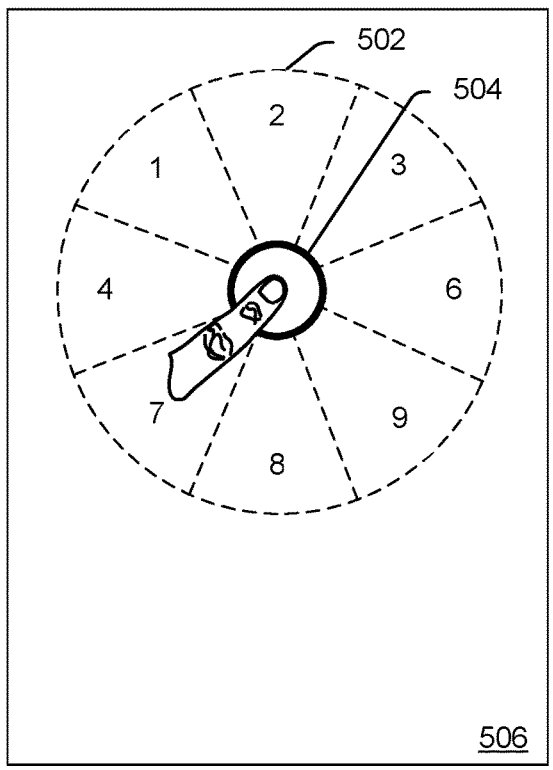
FIGS. 5A-5D illustrate examples of a computing device using inputs to determine positions for a self-centering user interface.

FIGS. 5A-5D illustrate examples of determining positions for a self-centering user 502 interface when inputs are received by a computing device (e.g., the merchant device(s), the merchant-facing computing device 202, 302, the customer-facing computing device 204, the customer device 304, etc.). For instance, as illustrated in the example of FIG. 5A, the computing device may receive an input at a first location 504 of a display 506. Based on the first location 504, the computing device may determine a first positioning for the user interface 502. For example, the computing device may determine that the user interface 502 is to be substantially centered at the first location 504 (e.g., the number five is located at the first location 504). In some instances, the computing device may use the first positioning to display the user interface 502 on the display 506. For instance, the computing device may display, on the display 506, the user interface 502 as being substantially centered at the first location 504.

Figure 5B:
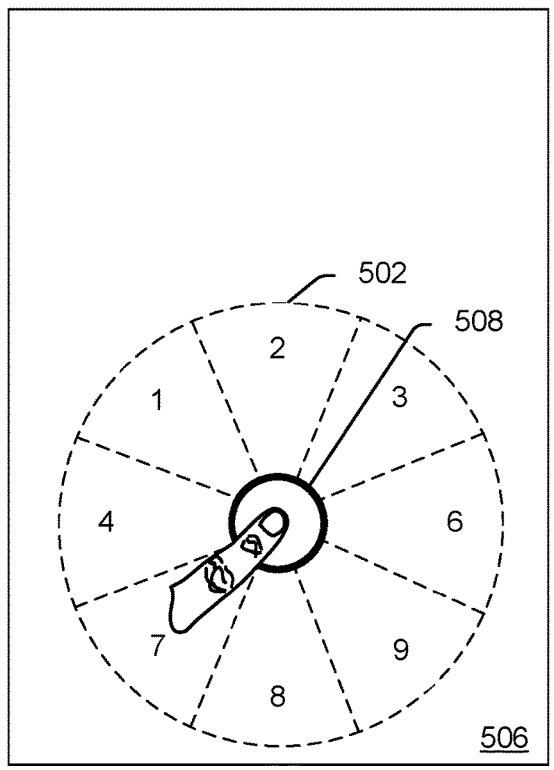

As illustrated in the example of FIG. 5B, the computing device may receive an input at a second location 508 of the display 506. As shown, the second location 508 is different than the first location 504. Based on the second location 508, the computing device may determine a second positioning for the user interface 502. For example, the computing device may determine that the user interface 502 is to be substantially centered at the second location 508 (e.g., the number five is located at the second location 508). In some instances, the computing device may use the second positioning to display the user interface 502 on the display 506. For instance, the computing device may display, on the display 506, the user interface 502 as being substantially centered at the second location 508.

Figure 5C:
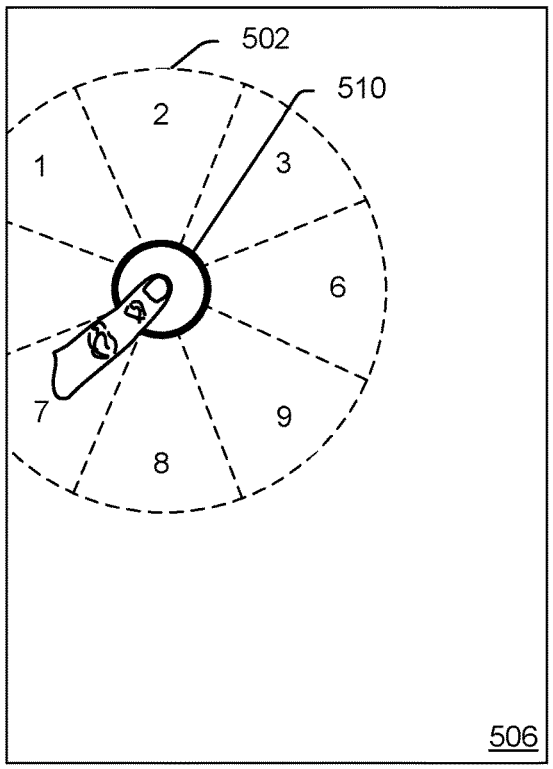

As illustrated in the example of FIG. 5C, the computing device may receive an input at a third location 510 of the display 506. As shown, the third location 510 is different than the first location 504 and the second location 508. Based on the third location 510, the computing device may determine a third positioning for the user interface 502. For example, the computing device may determine that the user interface 502 is to be substantially centered at the third location 510 (e.g., the number five is located at the third location 510). In some instances, the computing device may use the third positioning to display the user interface 502 on the display 506. For instance, the computing device may display, on the display 506, the user interface 502 as being substantially centered at the third location 510.

As further illustrated in the example of FIG. 5C, based on the third positioning, a portion of the user interface 502 may be located off of the display 506. For instance, the number seven may not be located on the display 506. In some instances, the computing device may output audio indicating that the portion of the user interface 502 is located off of the display 506. For instance, the audio may represent an instruction to place the finger closer to the center of the display 506. In some instances, even though the portion of the user interface 502 is located off of the display 506, the customer may still be able to select a symbol of the user interface 502. However, in such instances, the customer may be unable to select the symbol that is located off of the display 506. For instance, in the example of FIG. 5C, the customer may be unable to select the number four.

Figure 5D:
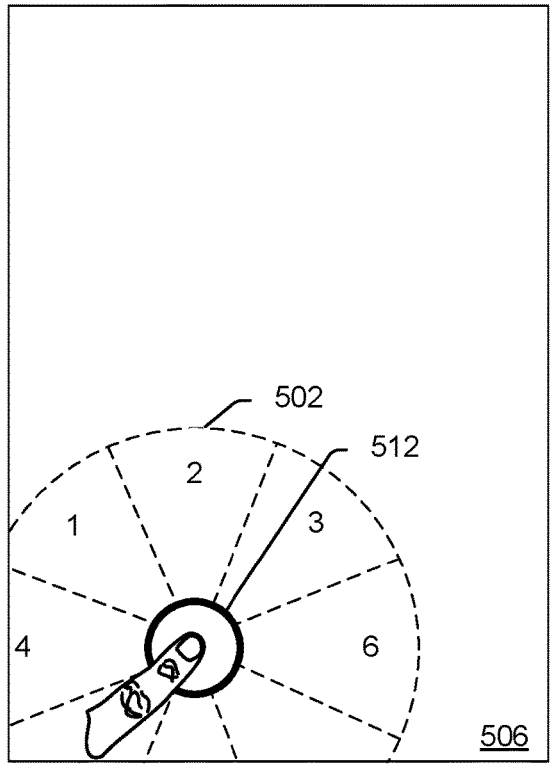

As illustrated in the example of FIG. 5D, the computing device may receive an input at a fourth location 512 of the display 506. As shown, the fourth location 512 is different than the first location 504, the second location 508, and the third location 510. Based on the fourth location 512, the computing device may determine a fourth positioning for the user interface 502. For example, the computing device may determine that the user interface 502 is to be substantially centered at the fourth location 512 (e.g., the number five is located at the fourth location 512). In some instances, the computing device may use the fourth positioning to display the user interface 502 on the display 506. For instance, the computing device may display, on the display 506, the user interface 502 as being substantially centered at the fourth location 512.

As further illustrated in the example of FIG. 5D, based on the fourth positioning, a portion of the user interface 502 may be located off of the display 506. For instance, the numbers seven through nine may not be located on the display 506. In some instances, the computing device may output audio indicating that the portion of the user interface 502 is located off of the display 506. For instance, the audio may represent an instruction to place the finger closer to the center of the display 506. In some instances, even though the portion of the user interface 502 is located off of the display 506, the customer may still be able to select a symbol of the user interface 502. However, in such instances, the customer may be unable to select the symbols that is located off of the display 506. For instance, in the example of FIG. 5D, the customer may be unable to select the numbers seven through nine.

In the examples of FIGS. 5A-5D, the user interface 502 is illustrated as including dashed lines. In some instances, when displaying the user interface 502, the computing device may display one or more of the dashed lines. Additionally, or alternatively, in some instances, when displaying the user interface 502, the computing device may refrain from displaying one or more of the dashed lines. Additionally, the examples of FIGS. 5A-5D illustrate the user interface 502 as including a circular shape, where the numbers one through four and six through nine are positioned around the number five in a circular pattern. However, in other examples, the user interface 502 may include a different shape, where the numbers one through four and six through nine are positioned around the number five using a different pattern (e.g., a square, a pentagon, a hexagon, an octagon, and/or any other shape).

Furthermore, while the example of FIGS. 5A-5D illustrate the user interface 502 as including the number five in the center and the numbers one through four and six through nine positioning around the number five, in other examples, a self-centering user interface may include a different positioning for numbers. For example, a self-centering user interface may include the number zero positioned in the center of the self-centering user interface with the numbers one through nine positioned around the number zero.

Figure 6:
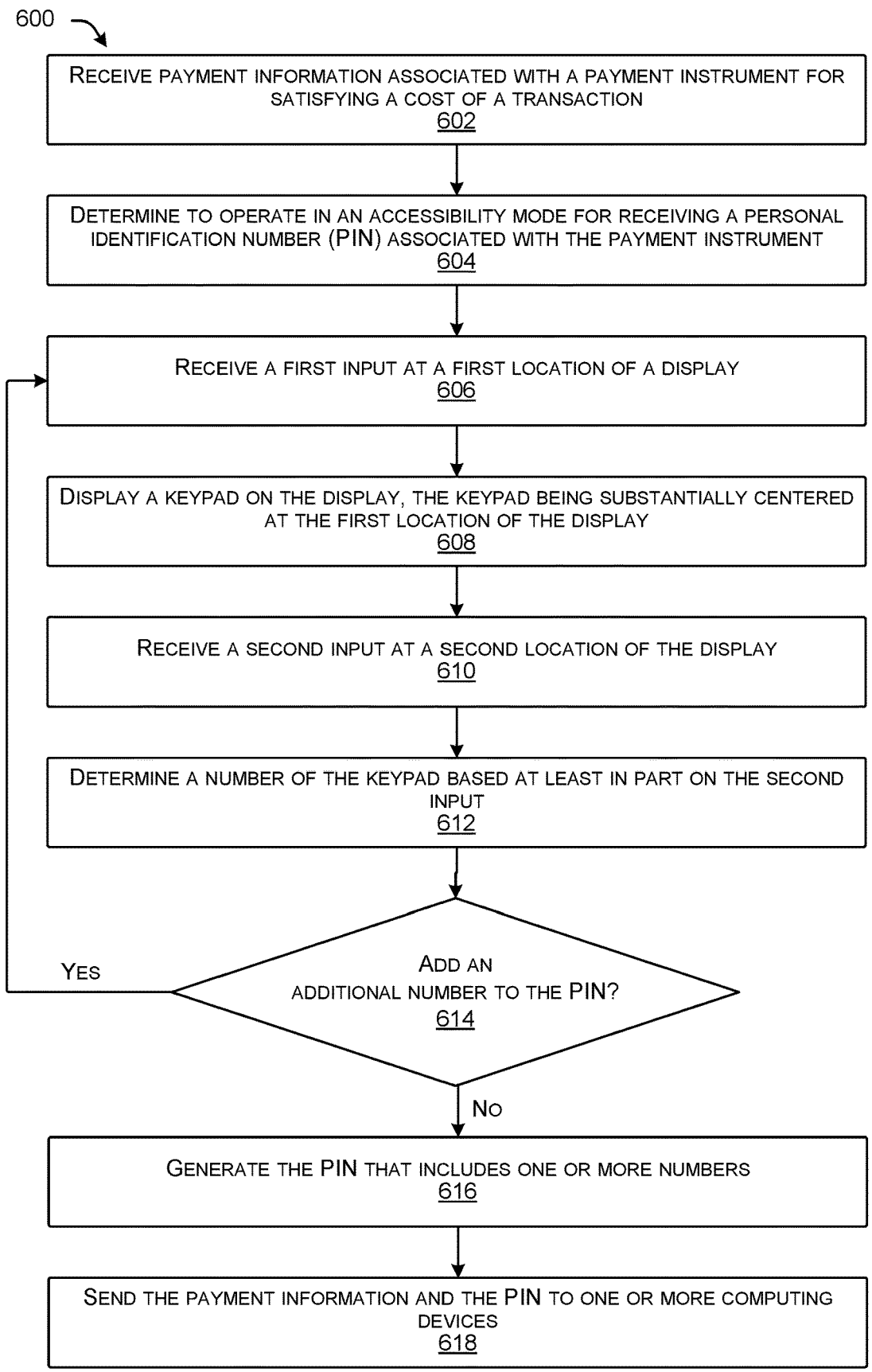
FIG. 6 illustrates an example process of using a self-centering keypad to input a personal identification number associated with a payment instrument.
Figure 7:
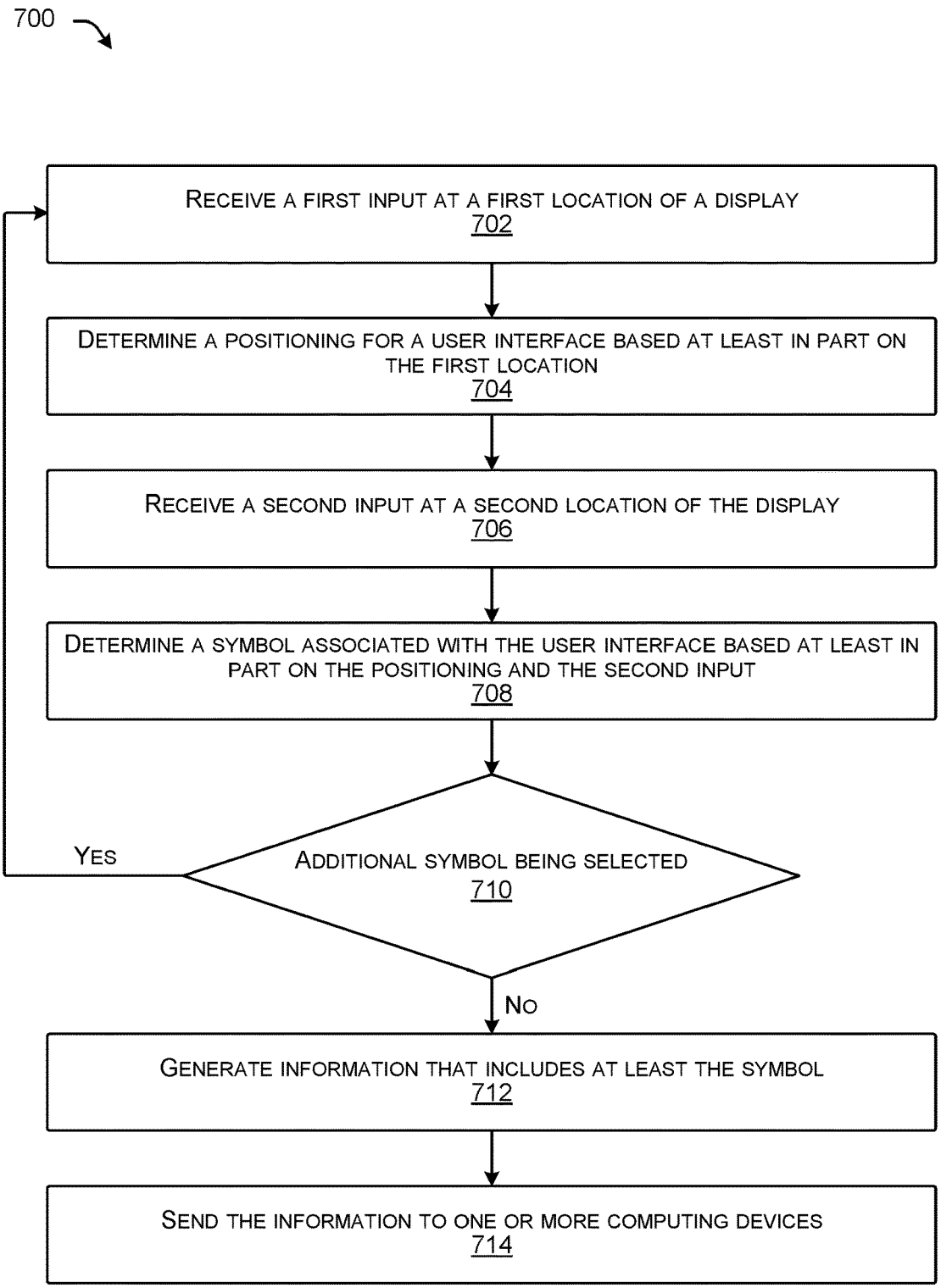
FIG. 7 illustrates an example process of using a self-centering user interface to input information.
Figure 8:
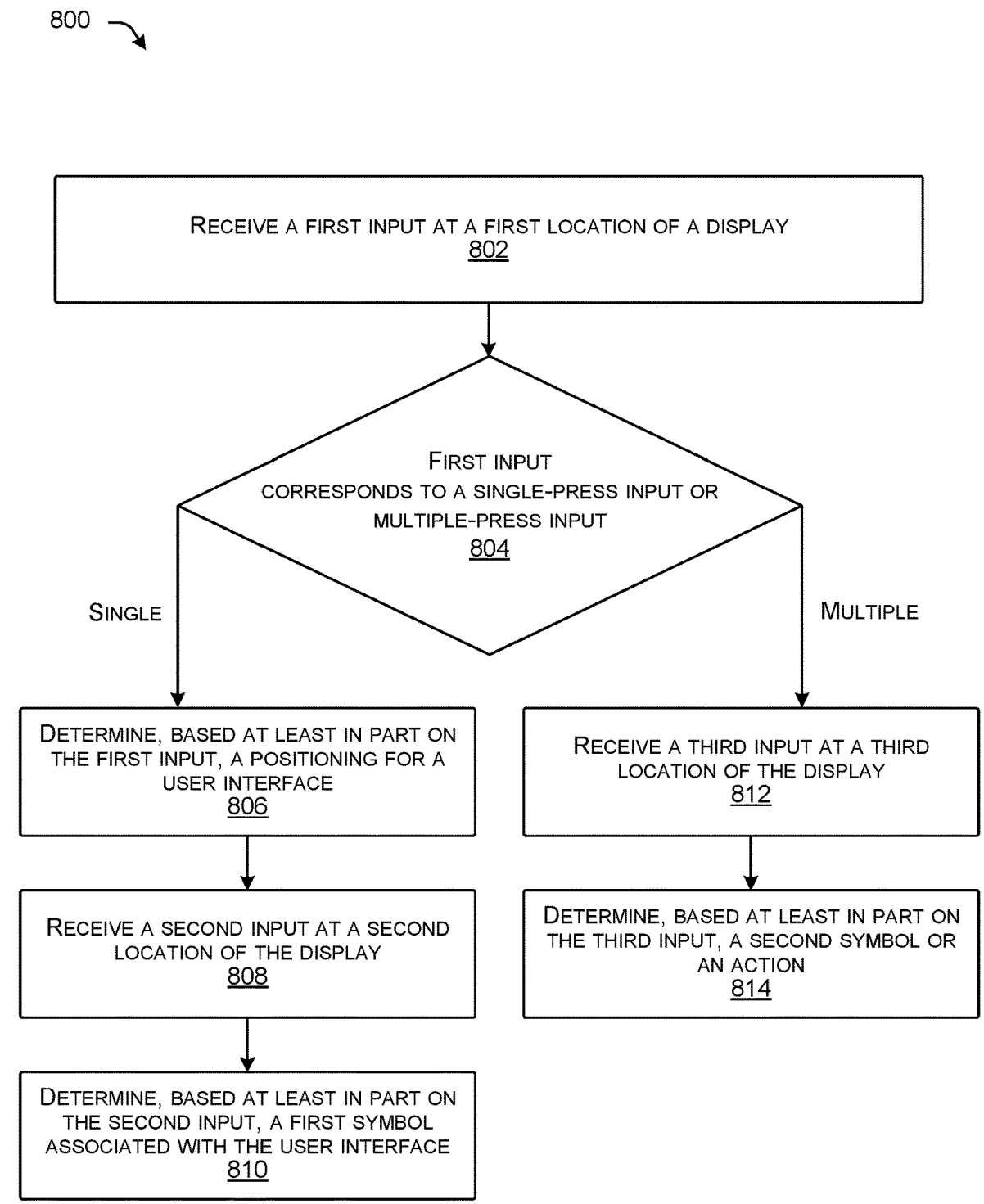
FIG. 8 illustrates an example process of determining a number of input implements corresponding to an input, and then using the determination to determine that an additional input includes a symbol or an action.

FIGS. 6-8 are flow diagrams illustrating example processes according to some examples. The processes of FIGS. 6-8 are illustrated as collections of blocks in logical flow diagrams, which represent a sequence of operations, some or all of which can be implemented in hardware, software or a combination thereof. In the context of software, the blocks can represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. Further, in some examples, some or all of the operations illustrated in one or more of FIGS. 6-8 can be combined with some or all of the operations illustrated in others of FIGS. 6-8.

FIG. 6 illustrates an example process 600 of using a self-centering keypad to input a PIN associated with a payment instrument. At operation 602, a computing device (e.g., the merchant device(s), the merchant-facing computing device 202, 302, the customer-facing computing device 204, the customer device 304, etc.) may receive payment information associated with a payment instrument for satisfying a cost of a transaction. In some instances, the computing device may include a reader (e.g., a near-field-communication reader, a chip reader, etc.) that receives the payment information from the payment instrument and/or the customer device. In some instances, based on receiving the payment information, the computing device may display a keypad for inputting a PIN associated with the payment instrument.

At operation 604, the computing device may determine to operate in an accessibility mode for receiving a personal identification number (PIN) associated with the payment information. In some instances, the computing device determines to operate in the accessibility mode based on receiving an input from the merchant and/or the customer. In some instances, the computing device determines to operate in the accessibility mode based on the payment information associated with the payment instrument. For instance, the payment information may include an indication to operate in the accessibility mode.

At operations 606, the computing device may receive a first input at a first location of a display. In some instances, the first input may correspond to the customer placing one or more input implements (e.g., one or more fingers) on the first location of the display. In some instances, before receiving the first input, the computing device may output, using at least one speaker, audio representing an instruction to place the one or more input implements on the display.

At operation 608, the computing device may display a keypad on the display, the keypad being substantially centered at the first location of the display. For instance, the computing device may determine a positioning for the keypad such that the keypad is substantially centered at the first location of the display. The computing device may then display the keypad using the positioning. In some instances, the keypad includes a given shape, such as a circle, a square, a pentagon, a hexagon, an octagon, and/or the like.

At operations 610, the computing device may receive a second input at a second location of the display. In some instances, the second input may correspond to a swipe on the display from the first location of the display to the second location of the display. In some instances, the second input may correspond to the customer removing the one or more input implements from the second location, where the second location includes the first location. In some instances, before receiving the second input, the computing device may output, using the at least one speaker, audio representing an instruction to provide the second input. For instance, the instruction may indicate that swiping the one or more input implements in given directions on the display will select numbers included in the user interface.

At operation 612, the computing device may determine a specific number of the keypad based at least in part on the second input. For a first example, the computing device may determine that the second location corresponds to a portion of the keypad that include the specific number included in the keypad. Based on the determination, the computing device may determine the specific number. For a second example, the computing device may determine a specific direction associated with the swipe from the first location of the display to the second location of the display. The computing device may then determine that the specific direction corresponds to the specific number included in the keypad. Based on the determination, the computing device may determine the specific number. Still, for a third example, the computing device may determine that the second input includes removing the one or more input implements from the display. Based on the determination, the computing device may determine the specific number includes the number that was substantially centered at the first location. In either example, the computing device may then output, using the at least one speaker, audio indicating the specific number selected by the customer.

At operation 614, the computing device may determine whether to add an additional number to the PIN. In some instances, the computing device may determine to add the additional number based on the customer once again providing an input using the display. The input may include the customer placing one or more input implements on the display. In some instances, the computing device may determine to add the additional number based on how many numbers the customer has entered into the computing device. For instance, the computing device may determine that the customer has yet to enter the total amount of numbers required for the PIN.

In some instances, the computing device may determine not to add the additional number based on the how many numbers the customer has entered into the computing device. For instance, the computing device may determine that the customer has entered by the total amount of numbers that are required for the PIN. Still, in some instances, the computing device may determine not to add the additional number based on receiving an input indicating that the PIN is complete. For instance, the input may include the user placing two input implements on the display and then swiping the two input implements in a given direction.

If at operation 614 the computing device determines to add the additional number to the PIN, then the computing device may repeat operations 606-612. However, if at 614 the computing device determines not to add the additional number to the PIN, then at operation 616, the computing device may generate the PIN that includes at least the specific number. For instance, the PIN may include each of the numbers input into the computing device. In some instances, the computing device may then encrypt data representing the PIN.

At operation 618, the computing device may send the payment information and the PIN to one or more computing devices. In some instances, the one or more computing devices may include a merchant device (e.g., the merchant-facing computing device 202, 302, the customer-facing computing device 204, etc.) and/or the payment-processing service server(s). In some instances, the computing device may then receive, from the one or more computing devices, data indicating whether the payment instrument was authorized for the cost of the transaction.

FIG. 7 illustrates an example process 700 of using a self-centering user interface to input information. At operations 702, a computing device (e.g., the merchant device(s), the merchant-facing computing device 202, 302, the customer-facing computing device 204, the customer device 304, etc.) may receive a first input at a first location of a display. In some instances, the first input may correspond to the customer placing one or more input implements at the first location of the display. In some instances, before receiving the first input, the computing device may output, using at least one speaker, audio representing an instruction to place the one or more input implements on the display.

At operation 704, the computing device may determine a positioning for a user interface based at least in part on the first location. For instance, the computing device may determine the positioning for the user interface such that the user interface is substantially centered at the first location of the display. In some instances, to determine the positioning, the computing device may determine an anchor point for the user interface. The anchor point, which may correspond to a point (e.g., the center) of the user interface, may include the first location of the display. In some instances, the computing device may then display the user interface using the positioning. In some instances, the user interface includes a self-centering keypad for inputting a PIN. In some instances, the user interface includes a given shape, such as a circle, a square, a pentagon, a hexagon, an octagon, and/or the like.

At operations 706, the computing device may receive a second input at a second location of the display. In some instances, the second input may correspond to a swipe on the display from the first location of the display to the second location of the display. In some instances, the second input may include removing the one or more input implements from the second location, where the second location includes the first location. In some instances, before receiving the second input, the computing device may output, using the at least one speaker, audio representing an instruction to provide the second input. For instance, the instruction may indicate that swiping the one or more input implements in given directions on the display will select symbols included in the user interface.

At operation 708, the computing device may determine a symbol associated with the user interface based at least in part on the positioning and the second input. For a first example, and using the positioning (and/or the anchor point), the computing device may determine that the second location corresponds to a portion of the user interface that include the symbol. Based on the determination, the computing device may determine the symbol. For a second example, the computing device may determine a specific direction of the swipe from the first location of the display to the second location of the display. The computing device may then determine, using the positioning (and/or the anchor point) that the specific direction corresponds to the symbol. Still, for a third example, the computing device may determine that the second input includes removing the one or more input implements from the display. The computing device may then determine the symbol as a symbol that is centrally located within the user interface. In some instances, the computing device may then output, using the at least one speaker, audio indicating the symbol selected by the customer.

At operation 710, the computing device may determine whether an additional symbol is being selected. In some instances, the computing device may determine that the additional symbol is being selected based on the customer once again providing an input using the display. The input may include the customer placing one or more input implements on the display. In some instances, the computing device may determine that the additional symbol is being selected based on how many symbols the customer has entered into the computing device. For instance, the computing device may determine that the customer has yet to enter the total amount of symbols required for the type of information (e.g., a PIN) being input into the computing device.

In some instances, the computing device may determine that the additional symbol is not being selected based on the how many symbols the customer has entered into the computing device. For instance, the computing device may determine that the customer has entered by the total amount of symbols required for the type of information. Still, in some instances, the computing device may determine that the additional symbol is not being selected based on receiving an input indicating that the information is complete. For instance, the input may include the user placing two input implements on the display and then swiping the two input implements in a given direction.

If at operation 710 the computing device determines that the additional symbol is being selected, then the computing device may repeat operations 702-708. However, if at 710 the computing device determines that the additional symbol is not being selected, then at operation 712, the computing device may generate information that includes at least the symbol. For instance, the information may include each of the symbols input into the computing device.

At operation 714, the computing device may send the information to one or more computing devices. In some instances, the one or more computing devices may include a merchant device (e.g., the merchant-facing computing device 202, 302, the customer-facing computing device 204, etc.) and/or the payment-processing service server(s). In some instances, the computing device may then receive, from the one or more computing devices, data indicating whether a payment instrument was authorized for the cost of the transaction.

FIG. 8 illustrates an example process 800 of determining a number of input implements corresponding to an input, and then using the determination to determine that an additional input includes a symbol or an action. At operations 802, a computing device (e.g., the merchant device(s), the merchant-facing computing device 202, 302, the customer-facing computing device 204, the customer device 304, etc.) may receive a first input at a first location of a display. In some instances, the first input may correspond to the customer placing a single input implement, such as a finger, at the first location of the display. In some instances, the first input may correspond to the customer placing multiple input implements, such as multiple fingers, at the first location of the display.

At operation 804, the computing device may determine whether the first input corresponds to a single-press input or a multiple-press input. For instance, the computing device may determine whether the first input corresponds to the single-press input, such as a single finger being placed at the first location of the display, or the multiple-press input, such as multiple fingers being placed at the first location of the display.

If at operation 804 the computing device determines that the first input corresponds to the single-press input, then at operation 806, the computing device may determine, based at least in part on the first input, a positioning for a user interface. For instance, the computing device may determine the positioning for the user interface such that the user interface is substantially centered at the first location of the display. In some instances, the computing device may then display the user interface using the positioning. In some instances, the user interface includes a self-centering keypad for inputting a PIN. In some instances, the user interface includes a given shape, such as a circle, a square, a pentagon, a hexagon, an octagon, and/or the like.

At operations 808, the computing device may receive a second input at a second location of the display. In some instances, the second input may correspond to a swipe of the single input implement on the display from the first location of the display to the second location of the display. In some instances, the second input may include removing the single input implement from the second location, where the second location includes the first location.

At operation 810, the computing device may determine, based at least in part on the second input, a first symbol associated with the user interface. For a first example, the computing device may determine that the second location corresponds to a portion of the user interface that include the first symbol. Based on the determination, the computing device may determine the first symbol. For a second example, the computing device may determine a specific direction of the swipe from the first location of the display to the second location of the display. The computing device may then determine that the specific direction corresponds to the first symbol. Still, for a third example, the computing device may determine that the second input includes removing the single input implement from the display. The computing device may then determine the first symbol based on the second input including the single input implement being removed from the display.

If at operation 804 the computing device determines that the first input corresponds to the multiple-press input, then at operation 812, the computing device may receive a third input at a third location of the display. In some instances, the third input may correspond to a swipe of the multiple input implements on the display from the first location of the display to the third location of the display. In some instances, the third input may include removing the multiple input implements from the third location, where the third location includes the first location.

At operation 814, the computing device may determine, based at least in part on the third input, a second symbol or an action. For a first example, the computing device may determine that the third input includes a swipe of the multiple input implements in a first direction on the display. Based on the first direction, the computing device may determine a first action (e.g., cancel information). For a second example, the computing device may determine that the third input includes a swipe of the multiple input implements in a second direction on the display. Based on the second direction, the computing device may determine a second action (e.g., the information is complete). Still, for a third example, the computing device may determine that the third input includes removing the multiple input implements from the display. The computing device may then determine the symbol based on the third input including the multiple input implements being removed from the display.

Figure 9:
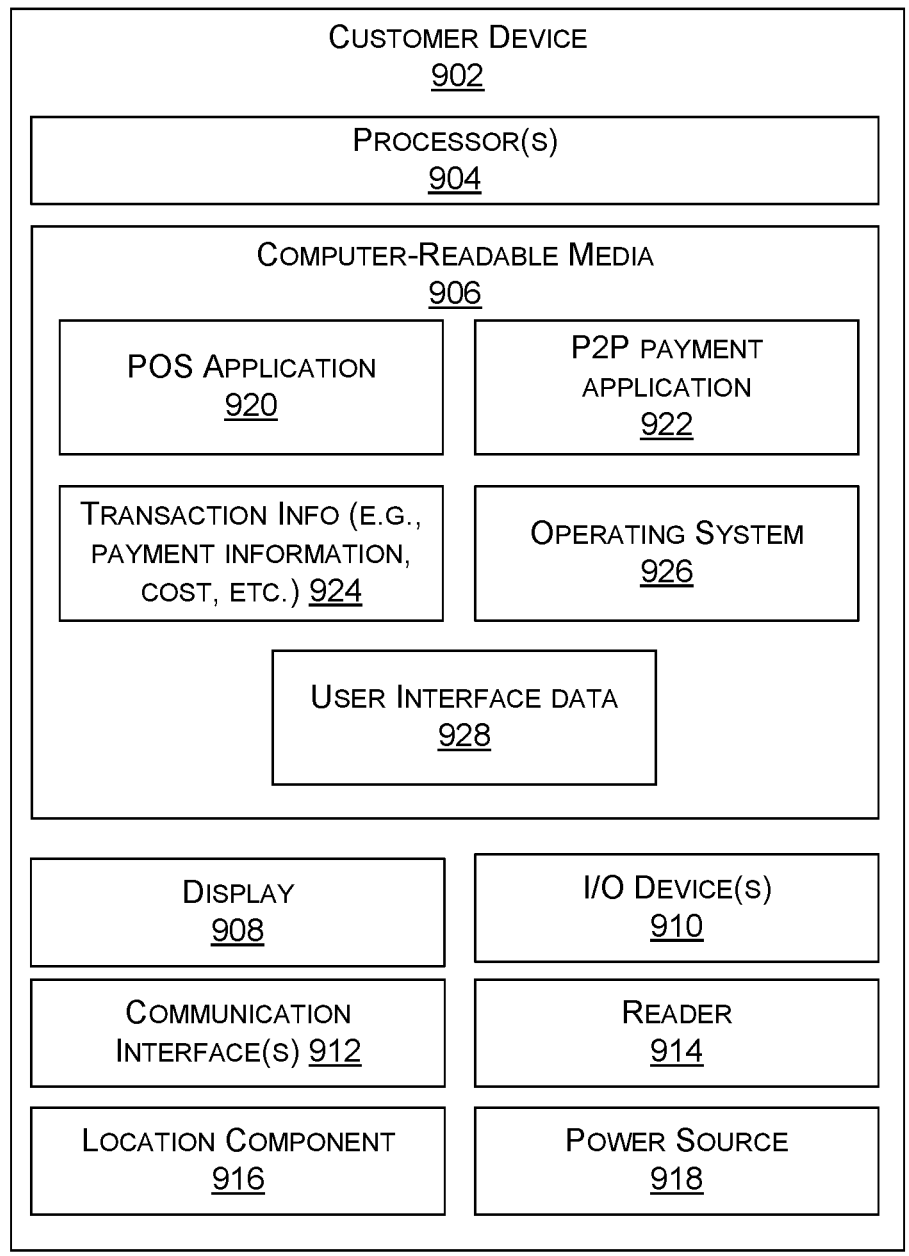
FIG. 9 illustrates a block diagram of select components of a customer device that may be configured to act as a POS device.

FIG. 9 illustrates example components of a customer device 902 that may be configured to act as a POS device, as described herein. The customer device 902, which may correspond to the customer device 304 of FIG. 3, may be any suitable type of computing device, e.g., mobile, semi-mobile, semi-stationary, or stationary. Some examples of the customer device 902 may include tablet computing devices; smart phones and mobile communication devices; laptops, netbooks and other portable computers or semi-portable computers; desktop computing devices, terminal computing devices and other semi-stationary or stationary computing devices; dedicated register devices; wearable computing devices, or other body-mounted computing devices; or other computing devices capable of sending communications and performing the functions according to the techniques described herein.

In the illustrated example, the customer device 902 includes processor(s) 904, computer-readable media 906, a display 908, input/output (I/O) device(s) 910, communication interface(s) 912, at least one card reader 914, at least one location component 916, and at least one power source 918. Each processor 904 may itself comprise one or more processors or processing cores. For example, the processor(s) 904 can be implemented as one or more microprocessors, microcomputers, microcontrollers, digital signal processors, central processing units, state machines, logic circuitries, and/or any devices that manipulate signals based on operational instructions. In some cases, the processor(s) 904 may be one or more hardware processors and/or logic circuits of any suitable type specifically programmed or configured to execute the algorithms and processes described herein. The processor(s) 904 can be configured to fetch and execute computer-readable processor-executable instructions stored in the computer-readable media 906.

Depending on the configuration of the customer device 902, the computer-readable media 906 may be an example of tangible non-transitory computer storage media and may include volatile and nonvolatile memory and/or removable and non-removable media implemented in any type of technology for storage of information such as computer-readable processor-executable instructions, data structures, program modules or other data. The computer-readable media 906 may include, but is not limited to, RAM, ROM, EEPROM, flash memory, solid-state storage, magnetic disk storage, optical storage, and/or other computer-readable media technology. Further, in some cases, the customer device 902 may access external storage, such as RAID storage systems, storage arrays, network attached storage, storage area networks, cloud storage, or any other medium that can be used to store information and that can be accessed by the processor(s) 904 directly or through another computing device or network. Accordingly, the computer-readable media 906 may be computer storage media able to store instructions, modules or components that may be executed by the processor(s) 904. Further, when mentioned, non-transitory computer-readable media exclude media such as energy, carrier signals, electromagnetic waves, and signals per se.

The computer-readable media 906 may be used to store and maintain any number of functional components that are executable by the processor(s) 904. In some examples, these functional components comprise instructions or programs that are executable by the processor(s) 904 and that, when executed, implement operational logic for performing the actions and services attributed above to the customer device 902. Functional components of the customer device 902 stored in the computer-readable media 906 may include a POS application 920. The POS application 920 may present an interface on the customer device 902 to enable the customer and/or the merchant to conduct transactions, receive payments, and so forth, as well as communicating with the payment-processing service for processing payments and sending transaction information. In addition, the computer-readable media 906 may include a P2P payment application 922. Additional functional components may include an operating system 926 for controlling and managing various functions of the customer device 902 and for enabling basic user interactions with the customer device 902. The computer-readable media 906 may also store transaction information 924 that is received based on the customer and/or merchant engaging in various transactions, such as the transactions discussed above. For instance, the transaction information 924 may include at least payment information associated with a payment instrument, a PIN, and for forth.

The computer-readable media 906 may also store user interface data 928. The user interface data 928 may represent at least the self-centering user interface(s), described herein, which the customer may use to input information associated with a transaction.

In addition, the computer-readable media 906 may also store data, data structures and the like, that are used by the functional components. For example, this data may include item information that includes information about the items offered by the merchant, which may include images of the items, descriptions of the items, prices of the items, and so forth. Depending on the type of the customer device 902, the computer-readable media 906 may also optionally include other functional components and data, which may include programs, drivers, etc., and the data used or generated by the functional components. Further, the customer device 902 may include many other logical, programmatic and physical components, of which those described are merely examples that are related to the discussion herein.

The communication interface(s) 912 may include one or more interfaces and hardware components for enabling communication with various other devices over the network or directly. For example, communication interface(s) 912 may enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

FIG. 9 further illustrates that the customer device 902 may include the display 908. Depending on the type of computing device used as the customer device 902, the display 908 may employ any suitable display technology. For example, the display 908 may be a liquid crystal display, a plasma display, a light emitting diode display, an OLED (organic light-emitting diode) display, an electronic paper display, or any other suitable type of display able to present digital content thereon. In some examples, the display 908 may have a touch sensor associated with the display 908 to provide a touchscreen display configured to receive touch inputs for enabling interaction with a graphic interface presented on the display 908. Accordingly, examples herein are not limited to any particular display technology. Alternatively, in some examples, the customer device 902 may not include the display 908, and information may be presented by other means, such as aurally.

The I/O device(s) 910, meanwhile, may include speakers, a microphone, a camera, various user controls (e.g., buttons, a joystick, a keyboard, a keypad, etc.), and/or a haptic output device, and so forth.

In addition, the customer device 902 may include or may be connectable to at least the reader 914, which may be same or similar as the reader 252 discussed above. In some examples, the reader 914 may comprise an NFC reader integral with or communicatively coupled to the customer device 902 may plug in to a port in the merchant device, such as a microphone/headphone port, a data port, or other suitable port. In other instances, the reader 914 is integral with the entire customer device 902. The reader may include a read head for reading a magnetic strip of a payment instrument, and further may include encryption technology for encrypting the information read from the magnetic strip. Alternatively, numerous other types of card readers may be employed with the devices herein, depending on the type and configuration of a particular customer device 902.

The location component 916 may include a GPS device able to indicate location information, or the location component 916 may comprise any other location-based sensor. The customer device 900 may also include one or more additional sensors (not shown), such as an accelerometer, gyroscope, compass, proximity sensor, and the like. Additionally, the customer device 900 may include various other components that are not shown, examples of which include removable storage, a power control unit, and so forth.

Figure 10:
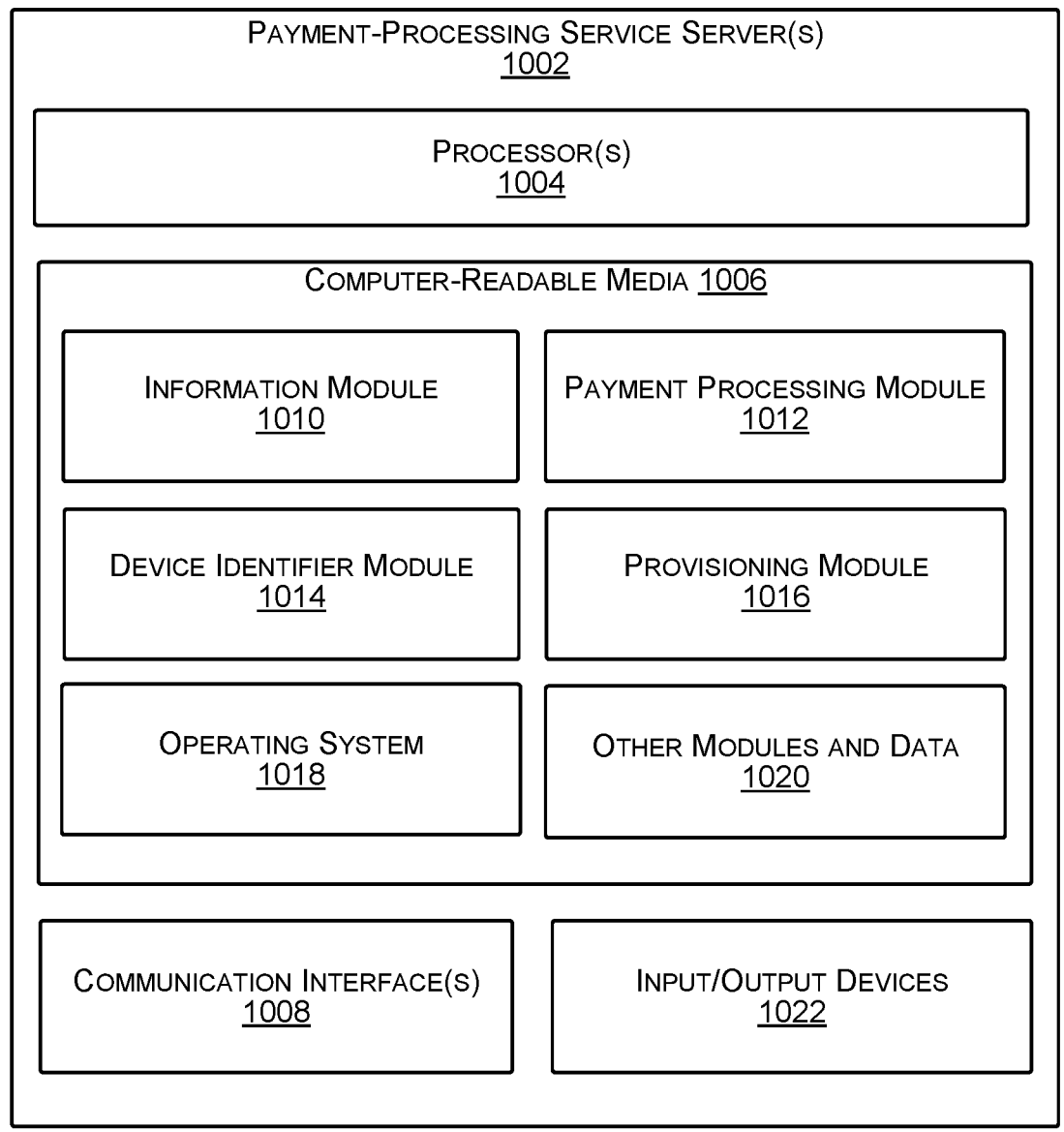
FIG. 10 illustrates a block diagram of select components of payment-processing service server(s).

FIG. 10 illustrates depicts an illustrative block diagram of select components of the payment-processing service server(s) 1002. In some examples, the payment-processing service server(s) 1002, which may correspond to the payment-processing service server(s) 222, can include one or more server computing devices or other types of computing devices that can be embodied in any number of ways. For instance, in the case of a server, the modules, other functional components, and data can be implemented on a single server, a cluster of servers, a server farm or data center, a cloud hosted computing service, a cloud hosted storage service, and so forth, although other computer architectures can additionally or alternatively be used.

Further, while FIG. 10 illustrates the components and data of the payment-processing service server(s) 1002 as being present in a single location, these components and data can alternatively be distributed across different computing devices and different locations in any manner. Consequently, the functions can be implemented by payment-processing service server(s) 1002, with the various functionality described above distributed in various ways across the different computing devices. Multiple payment-processing service server(s) 1002 can be located together or separately, and organized, for example, as virtual servers, server banks and/or server farms. The described functionality can be provided by the servers of a single entity or enterprise, or can be provided by the servers and/or services of multiple different buyers/customer or enterprises.

In the illustrated example, the payment-processing service server(s) 1002 can include processor(s) 1004, computer-readable media 1006, and communication interface(s) 1008. Each processor 1004 can be a single processing unit or a number of processing units, and can include single or multiple computing units or multiple processing cores. The processor(s) 1004 can be implemented as one or more microprocessors, microcomputers, microcontrollers, digital signal processors, central processing units, state machines, logic circuitries, and/or any devices that manipulate signals based on operational instructions. For instance, the processor(s) 1004 can be one or more hardware processors and/or logic circuits of any suitable type specifically programmed or configured to execute the algorithms and processes described herein. The processor(s) 1004 can be configured to fetch and execute computer-readable instructions stored in the computer-readable media 1006, which can program the processor(s) 1004 to perform the functions described herein.

The computer-readable media 1006 can include volatile and nonvolatile memory and/or removable and non removable media implemented in any type of technology for storage of information, such as computer-readable instructions, data structures, program modules, or other data. Such computer-readable media 1006 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the payment-processing service server(s) 1002, the computer-readable media 1006 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 1006 can be used to store any number of functional components that are executable by the processor(s) 1004. In many examples, these functional components comprise instructions or programs that are executable by the processor(s) 1004 and that, when executed, specifically configure the one or more processor(s) 1004 to perform the actions attributed above to payment-processing service server(s) 1002. Functional components stored in the computer-readable media 1006 can include an information module 1010, a payment processing module 1012, a device identifier module 1014, and/or a provisioning module 1016. Additional functional components stored in the computer-readable media 1006 can include an operating system 1018 for controlling and managing various functions of the payment-processing service server(s) 1002. Furthermore, in at least one example, the computer-readable media 1006 can store other modules and data 1020.

In at least one example, the information module 1010 can enable the payment-processing service server(s) 1002 to, among other things, access, receive, send, track, parse, and/or store (or otherwise manage the storage of) information, such as transaction data, payment data, merchant profiles, customer profiles, inventory, etc.

In some examples, the payment processing module 1012 can enable the payment-processing service server(s) 1002 to, among other things, process payments for one or more merchants. For instance, the payment processing module 1012 can provide the functionality for processing payments for multiple different merchants. In at least one example, the payment processing module 1012 can receive transaction information/data and/or payment information/data and can communicate with one or more card networks, or other payment services, to authorize transactions based on the transaction data and/or the payment data.

In at least one example, the device identifier module 1014 can be configured to receive requests to register a new device with the payment-processing service. In some examples, the device identifier module 1014 can assist with setting up anew account associated with the new device. In other examples, the device identifier module 1014 can receive a request associated with an account identifier of a previously registered merchant and can access information associated with the corresponding account (e.g., via a profile corresponding to the account identifier). The device identifier module 1014 can send such information (or representations thereof) to the new device to assist with onboarding.

The provisioning module 1016 can assist with temporarily provisioning functionality on devices (e.g., personal devices of users, merchant-facing computing devices, customer-facing computing devices, etc.). In some examples, a user can actuate a hyperlink that causes a request to be sent to the payment-processing service server(s) 1002. In such examples, the provisioning module 1016 can provision the functionality responsive to receiving the request. In at least one example, the provisioning module 1016 can access information stored in the information module 1010 to personalize at least one of how functionality is provisioned to a device and/or what functionality is provisioned to the device.

In addition, the computer-readable media 1006 can store data used for performing the operations described herein. The payment-processing service server(s) 1002 can also include or maintain other functional components and data, such as other modules and data 1020, which can include programs, drivers, etc., and the data used or generated by the functional components. Further, the payment-processing service server(s) 1002 can include many other logical, programmatic and physical components, of which those described above are merely examples that are related to the discussion herein.

The communication interface(s) 1008 can include one or more interfaces and hardware components for enabling communication with various other devices, such as over network(s). For example, the communication interface(s) 1008 can enable communication through one or more of the Internet, cable networks, cellular networks, wireless networks (e.g., Wi-Fi) and wired networks, Bluetooth®, BLE, NFC, and the like, as additionally enumerated elsewhere herein.

The payment-processing service server(s) 1002 can further be equipped with various input/output (I/O) device(s) 1022. Such I/O device(s) 1022 can include a display, various user interface controls (e.g., buttons, joystick, keyboard, mouse, touch screen, etc.), audio speakers, connection ports and so forth.

Various instructions, methods and techniques described herein can be considered in the general context of computer-executable instructions, such as program modules stored on computer-readable media, and executed by the processor(s) herein. Generally, program modules include routines, programs, objects, components, data structures, etc., for performing particular tasks or implementing particular abstract data types. These program modules, and the like, can be executed as native code or can be downloaded and executed, such as in a virtual machine or other just-in-time compilation execution environment. Typically, the functionality of the program modules can be combined or distributed as desired in various examples. An example of these modules and techniques can be stored on computer storage media or transmitted across some form of communication media.

Furthermore, the foregoing is merely illustrative of the principles of this disclosure and various modifications can be made by those skilled in the art without departing from the scope of this disclosure. The above described examples are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process parameters (e.g., dimensions, configurations, components, process step order, etc.) can be made to further optimize the provided structures, devices and methods, as shown and described herein. In any event, the structures and devices, as well as the associated methods, described herein have many applications. Therefore, the disclosed subject matter should not be limited to any single example described herein, but rather should be construed in breadth and scope in accordance with the appended claims.

What is claimed is:

1. A method comprising:
receiving, by an electronic device, from a payment instrument of a user, information associated with the payment instrument for satisfying a cost of a transaction between a merchant and the user;
receiving, by the electronic device, a first input at a first location of a display, wherein the first input comprises a first touch, performed by the user, using an input implement;
displaying, by the electronic device, on the display, a user interface comprising a keypad for inputting symbols to authorize the transaction, the keypad being substantially centered at the first location of the display with multiple symbols of the keypad being visually presented on the display, and at least some of the multiple symbols being positioned around the first location of the display;
receiving, by the electronic device, a second input on the keypad, wherein a gesture of the second input connects a second location of the display to the first location of the display, the second location of the display corresponding to a symbol of the keypad selected by the user;
receiving, by the electronic device, a third input at a third location of the display, wherein the third input comprises a second touch, performed by the user, using the input implement;
displaying, by the electronic device, on the display, the user interface comprising the keypad, the keypad being substantially centered at the third location of the display with the multiple symbols of the keypad being visually presented on the display, and the at least some of the multiple symbols being positioned around the third location of the display;
receiving, by the electronic device, a fourth input corresponding to a predefined gesture;
determining, by the electronic device, to conclude receiving the information based at least in part on the fourth input; and
sending, by the electronic device, the information to one or more computing devices for satisfying the cost of the transaction.

2. The method as recited in claim 1, wherein the symbol is a first symbol, and wherein the method further comprises, prior to the receiving the fourth input:
receiving, by the electronic device, a fifth input on the keypad, wherein a gesture of the fifth input connects a fourth location of the display to the third location of the display, the fourth location of the display corresponding to a second symbol of the keypad selected by the user,
wherein the information sent to the one or more computing devices includes the first symbol and the second symbol.

3. The method as recited in claim 1, further comprising, prior to the receiving the fourth input:
  based at least in part on the second input, adding, by the electronic device, the symbol to the information;
  receiving, by the electronic device, fifth input;
  determining that the fifth input is associated with the symbol; and
  based at least in part on the fifth input, removing, by the electronic device, the symbol from the information.

4. The method as recited in claim 1, wherein:
  the keypad is configured to receive input for a personal identification number (PIN) associated with the payment instrument;
  the symbols comprise numbers included in the keypad; and
  the information associated with the transaction is the PIN.

5. The method as recited in claim 1, further comprising:
  outputting, by the electronic device, first audio representing a first instruction to place the input implement on the display; and
  based at least in part on the displaying the user interface comprising the keypad substantially centered at the first location of the display, outputting, by the electronic device, second audio representing a second instruction associated with swiping the input implement over the display in order to select the symbol.

6. The method as recited in claim 1, wherein the information sent to the one or more computing devices includes the symbol.

7. The method as recited in claim 1, wherein the symbol is a first symbol, and wherein the method further comprises, after the displaying the user interface comprising the keypad substantially centered at the third location of the display and prior to the receiving the fourth input:
  receiving, by the electronic device, a fifth input comprising the user removing the input implement from the display, wherein removal of the input implement from the display corresponds to a second symbol of the keypad selected by the user.

8. The method as recited in claim 1, wherein the symbol is a first symbol, wherein the third input comprises the user touching two input implements, including the input implement, on the display at the third location of the display, and wherein the method further comprises, after the displaying the user interface comprising the keypad substantially centered at the third location of the display and prior to the receiving the fourth input:
  receiving, by the electronic device, a fifth input comprising the user removing the two input implements from the display, wherein removal of the two input implements from the display corresponds to a second symbol of the keypad selected by the user.

9. An electronic device comprising:
  a display;
  one or more processors; and
  one or more computer-readable media storing instructions that, when executed by the one or more processors, cause the one or more processors to perform operations comprising:
    receiving, from a payment instrument of a user, information associated with the payment instrument for satisfying a cost of a transaction between a merchant and the user;
    receiving a first input at a first location of the display, wherein the first input comprises a first touch, performed by the user, using an input implement;
    displaying, on the display, a user interface comprising a keypad for inputting symbols to authorize the transaction, the keypad being substantially centered at the first location of the display with multiple symbols of the keypad being visually presented on the display, and at least some of the multiple symbols being positioned around the first location of the display;
    receiving a second input on the keypad, wherein a gesture of the second input connects a second location of the display to the first location of the display, the second location of the display corresponding to a symbol of the keypad selected by the user;
    receiving a third input at a third location of the display, wherein the third input comprises a second touch, performed by the user, using the input implement;
    displaying, on the display, the user interface comprising the keypad, the keypad being substantially centered at the third location of the display with the multiple symbols of the keypad being visually presented on the display, and the at least some of the multiple symbols being positioned around the third location of the display;
    receiving a fourth input corresponding to a predefined gesture;
    determining to conclude receiving the information based at least in part on the fourth input; and
    sending the information to one or more computing devices for satisfying the cost of the transaction.

10. The electronic device as recited in claim 9, the operations further comprising:
  outputting first audio representing a first instruction to place the input implement on the display; and
  based at least in part on the displaying the user interface comprising the keypad substantially centered at the first location of the display, outputting second audio representing a second instruction associated with swiping the input implement over the display in order to select the symbol.

11. The electronic device as recited in claim 9, wherein the symbol is a first symbol, and wherein the operations further comprise, prior to the receiving the fourth input:
  receiving a fifth input on the keypad, wherein a gesture of the fifth input connects a fourth location of the display to the third location of the display, the fourth location of the display corresponding to a symbol of the keypad selected by the user,
  wherein the information sent to the one or more computing devices includes the first symbol and the symbol.

12. The electronic device as recited in claim 9, wherein:
  the keypad is configured to receive input for a personal identification number (PIN) associated with the payment instrument;
  the symbols comprise numbers included in the keypad; and
  the information includes the PIN associated with the payment instrument.

13. The electronic device as recited in claim 9, wherein the information sent to the one or more computing devices includes the symbol.

14. The electronic device as recited in claim 9, wherein the symbol is a first symbol, and wherein the operations further comprise, after the displaying the user interface comprising the keypad substantially centered at the third location of the display and prior to the receiving the fourth input:

receiving a fifth input comprising the user removing the input implement from the display, wherein removal of the input implement from the display corresponds to a second symbol of the keypad selected by the user.

15. The electronic device as recited in claim 9, wherein the symbol is a first symbol, wherein the third input comprises the user touching two input implements, including the input implement, on the display at the third location of the display, and wherein the operations further comprise, after the displaying the user interface comprising the keypad substantially centered at the third location of the display and prior to the receiving the fourth input:

receiving a fifth input comprising the user removing the two input implements from the display, wherein removal of the two input implements from the display corresponds to a second symbol of the keypad selected by the user.

16. A point-of-sale (POS) device of a merchant, comprising:
   a touchscreen display;
   one or more processors; and
   one or more computer-readable media storing instructions that, when executed by the one or more processors, cause the one or more processors to perform operations comprising:
      receiving, from a payment instrument of a user, payment information associated with the payment instrument for satisfying a cost of a transaction between the merchant and the user;
      receiving a first input at a first location of the touchscreen display, wherein the first input comprises a first touch, performed by the user, using an input implement;
      displaying, on the touchscreen display, a user interface comprising a keypad for inputting symbols to authorize the transaction, the keypad being substantially centered at the first location of the touchscreen display with multiple symbols of the keypad being visually presented on the touchscreen display, and at least some of the multiple symbols being positioned around the first location of the touchscreen display;
      receiving a second input on the keypad, wherein a gesture of the second input connects a second location of the touchscreen display to the first location of the touchscreen display, the second location of the touchscreen display corresponding to a symbol of the keypad selected by the user;
      receiving a third input at a third location of the touchscreen display, wherein the third input comprises a second touch, performed by the user, using the input implement;
      displaying, on the touchscreen display, the user interface comprising the keypad, the keypad being substantially centered at the third location of the touchscreen display with the multiple symbols of the keypad being visually presented on the touchscreen display, and the at least some of the multiple symbols being positioned around the third location of the touchscreen display;
      receiving a fourth input corresponding to a predefined gesture;
      determining to conclude receiving the payment information based at least in part on the fourth input; and
      sending, to a payment system, the payment information for satisfying the cost of the transaction.

17. The POS device as recited in claim 16, further comprising at least one speaker, and wherein the operations further comprise:
   causing the at least one speaker to output first audio, the first audio representing a first instruction associated with placing the input implement on the touchscreen display; and
   based at least in part on the displaying the user interface comprising the keypad substantially centered at the first location of the touchscreen display, causing the at least one speaker to output second audio, the second audio representing a second instruction associated with swiping the input implement over the keypad in order to select the symbol.

18. The POS device as recited in claim 16, wherein the symbol is a first symbol, and wherein the operations further comprise, after the displaying the user interface comprising the keypad substantially centered at the third location of the touchscreen display and prior to the receiving the fourth input:
   receiving a fifth input comprising the user removing the input implement from the touchscreen display, wherein removal of the input implement from the touchscreen display corresponds to a second symbol of the keypad selected by the user.

19. The POS device as recited in claim 16, wherein the symbol is a first symbol, wherein the third input comprises the user touching two input implements, including the input implement, on the touchscreen display at the third location of the touchscreen display, and wherein the operations further comprise, after the displaying the user interface comprising the keypad substantially centered at the third location of the touchscreen display and prior to the receiving the fourth input:
   receiving a fifth input comprising the user removing the two input implements from the touchscreen display, wherein removal of the two input implements from the touchscreen display corresponds to a second symbol of the keypad selected by the user.

20. The POS device as recited in claim 16, wherein the gesture of the second input comprises a swipe gesture.

* * * * *